US009554593B2

(12) United States Patent
Righolt et al.

(10) Patent No.: US 9,554,593 B2
(45) Date of Patent: Jan. 31, 2017

(54) FOOD FORMING APPARATUS WITH A FOOD FEED MEMBER

(75) Inventors: Hendrik Jan Righolt, Oosterhout (NL); Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 0 days.

(21) Appl. No.: 14/232,970

(22) PCT Filed: Jul. 13, 2012

(86) PCT No.: PCT/EP2012/063840
§ 371 (c)(1),
(2), (4) Date: Feb. 24, 2014

(87) PCT Pub. No.: WO2013/014010
PCT Pub. Date: Jan. 31, 2013

(65) Prior Publication Data
US 2014/0199423 A1 Jul. 17, 2014

(30) Foreign Application Priority Data

Jul. 25, 2011 (EP) .................................... 11006069
Oct. 27, 2011 (EP) .................................... 11008633
Mar. 20, 2012 (EP) .................................... 12001945

(51) Int. Cl.
*B28B 13/00* (2006.01)
*A23P 1/10* (2006.01)
(Continued)

(52) U.S. Cl.
CPC .............. *A23P 1/105* (2013.01); *A22C 7/0069* (2013.01); *A22C 7/0092* (2013.01); *A23P 30/10* (2016.08); *B29C 43/3697* (2013.01); *B29C 43/40* (2013.01)

(58) Field of Classification Search
CPC ........ A23P 1/105; A23P 30/10; A22C 7/0069; A22C 7/0092; B29C 43/3697; B29C 43/40
(Continued)

(56) References Cited

U.S. PATENT DOCUMENTS 1,971,087 A    8/1934  Werner
2,657,423 A   11/1953  Elsaesser
(Continued)

FOREIGN PATENT DOCUMENTS

DE   102006020361 A1   8/2007
EP        0818148 A1   1/1998
(Continued)

OTHER PUBLICATIONS

International Search Report, Serial No. PCT/EP2012/063840, mailed Aug. 10, 2012.
(Continued)

*Primary Examiner* — Joseph S. Del Sole
*Assistant Examiner* — John Robitaille
(74) *Attorney, Agent, or Firm* — The Dobrusin Law firm, P.C.

(57) ABSTRACT

The present invention relates to a food-forming-apparatus with: a rotating drum (5) which comprises product cavities in which a food product is formed from a food mass and a food mass feed member (23), which comprises a housing with an infeed channel (24) and at least one upstream sealing area (25) and/or a downstream sealing area (26) and a flexible pressure plate (7) which is pressed against the outer surface of the drum and thereby provides a seal between the food mass member and the drum. The drum has at its outer surface a multitude of rows of cavities.

19 Claims, 34 Drawing Sheets

(51) Int. Cl.
*A22C 7/00* (2006.01)
*B29C 43/36* (2006.01)
*B29C 43/40* (2006.01)

(58) Field of Classification Search
USPC ........................................................ 425/142
See application file for complete search history.

(56) References Cited

U.S. PATENT DOCUMENTS

| | | | |
|---|---|---|---|
| 3,177,524 | A | 4/1965 | Gause |
| 3,205,837 | A | 9/1965 | Fay |
| 3,213,486 | A | 10/1965 | Blake |
| 3,347,176 | A | 10/1967 | Hall |
| 3,724,026 | A | 4/1973 | Gernandt |
| 3,750,232 | A | 8/1973 | Holly |
| 3,823,633 | A | 7/1974 | Ross |
| 3,991,440 | A | 11/1976 | Hendrickson, Jr. |
| 3,998,574 | A | 12/1976 | Blake |
| 4,059,378 | A | 11/1977 | Sollich |
| 4,182,003 | A | 1/1980 | Lamartino et al. |
| 4,418,446 | A | 12/1983 | Sandberg |
| 4,625,612 | A | 12/1986 | Oliver |
| 4,630,425 | A | 12/1986 | Reed |
| 4,630,426 | A | 12/1986 | Gentry |
| 4,768,325 | A | 9/1988 | Lindee et al. |
| 4,987,643 | A | 1/1991 | Powers |
| 5,102,238 | A | 4/1992 | Contzen |
| 6,131,372 | A | 10/2000 | Pruett |
| 6,368,092 | B1 | 4/2002 | Lindee |
| 6,371,278 | B1 | 4/2002 | Hart et al. |
| 6,764,293 | B2 | 7/2004 | Kashulines et al. |
| 2005/0009696 | A1 | 1/2005 | Mao et al. |
| 2005/0013895 | A1 | 1/2005 | Azzar |
| 2005/0042321 | A1 | 2/2005 | LaBruno |
| 2005/0214399 | A1 | 9/2005 | LaBruno et al. |
| 2005/0220932 | A1 | 10/2005 | Van Der Eerden |
| 2008/0202226 | A1 | 8/2008 | Heim et al. |
| 2011/0151082 | A1 | 6/2011 | VanGerwen |
| 2013/0045294 | A1 | 2/2013 | Van Gerwen et al. |
| 2013/0164403 | A1 | 6/2013 | Boogers et al. |
| 2013/0224357 | A1 | 8/2013 | Van Gerwen |
| 2013/0273192 | A1 | 10/2013 | Van Gerwen |
| 2013/0280393 | A1 | 10/2013 | Van Gerwen |
| 2013/0291483 | A1 | 11/2013 | Van Gerwen |
| 2013/0337128 | A1 | 12/2013 | Van Gerwen et al. |

FOREIGN PATENT DOCUMENTS

| | | | |
|---|---|---|---|
| EP | 1520480 | A1 | 4/2005 |
| EP | 1920847 | A1 | 5/2008 |
| EP | 2064956 | A1 | 6/2009 |
| EP | 2380442 | A2 | 10/2011 |
| FR | 2387609 | A1 | 11/1978 |
| GB | 1015820 | A | 1/1966 |
| GB | 2312641 | A | 11/1997 |
| JP | 2001299317 | A | 10/2001 |
| WO | 88/07003 | A1 | 9/1988 |
| WO | 96/09210 | A1 | 3/1996 |
| WO | 2004/002229 | A2 | 1/2004 |
| WO | 2005/009696 | A1 | 2/2005 |
| WO | 2005/107481 | | 11/2005 |
| WO | 2006/020139 | A1 | 2/2006 |
| WO | 2008/091634 | A2 | 7/2008 |
| WO | 2010/110655 | A1 | 9/2010 |
| WO | WO 2010110655 | A1 * | 9/2010 ........... A22C 7/0069 |
| WO | 2012/012581 | A1 | 1/2012 |
| WO | 2012/055454 | A2 | 5/2012 |
| WO | 2012/059188 | A1 | 5/2012 |
| WO | 2012/107236 | A2 | 8/2012 |
| WO | 2013/107815 | A2 | 7/2013 |

OTHER PUBLICATIONS

International Preliminary Report on Patentability, Serial No. PCT/EP2012/063840, mailed on Dec. 18, 2013.
Potentially related Application, U.S. Appl. No. 13/883,152 Published as 2013/0224357, Aug. 29, 2013.
Potentially related Application, U.S. Appl. No. 13/988,360 Published as 2013/0280393, Oct. 24, 2013.
Potentially related Application, U.S. Appl. No. 13/944,973 Published as 2013/0273192, Oct. 17, 2013.
Potentially related Application, U.S. Appl. No. 13/980,778 Published as 2013/0291483, Nov. 7, 2013.
Potentially related Application. U.S. Appl. No. 13/982,377, Publishes as 2013/0337128, Dec. 19, 2013.
European Examination Report for European Application No. 12733780.6, dated on Feb. 16, 2016.
Third Party Observation for Application No. EP20120733780, Publication No. EP2736343 dated Feb. 19, 2015.
Examination Report dated Apr. 14, 2016 from Russia Patent Office for Russian Patent Application No. 2014 106 760, which corresponds to PCT/EP2012/063840 (WO 2013/014010).

* cited by examiner

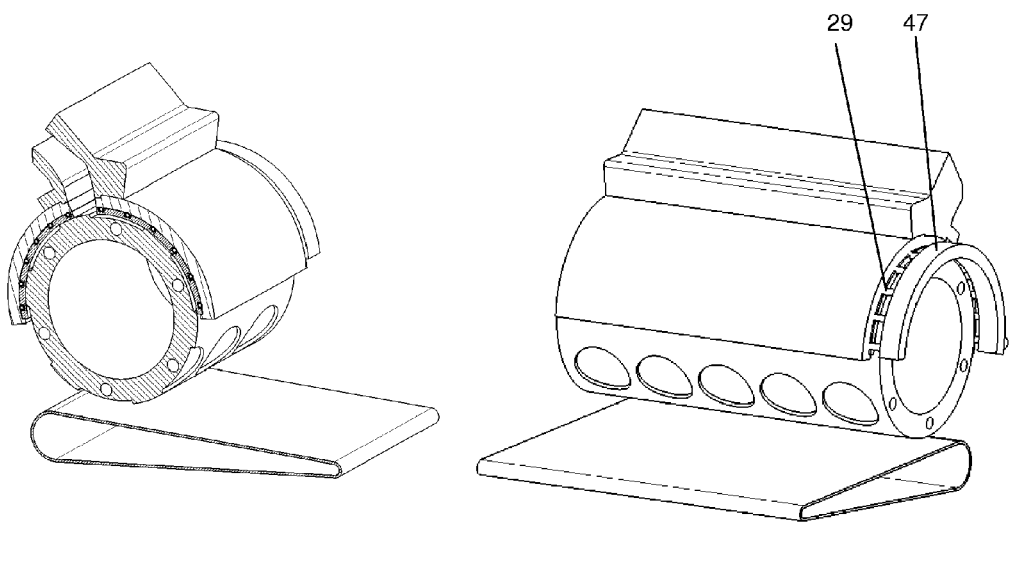
46     45     24     10     9
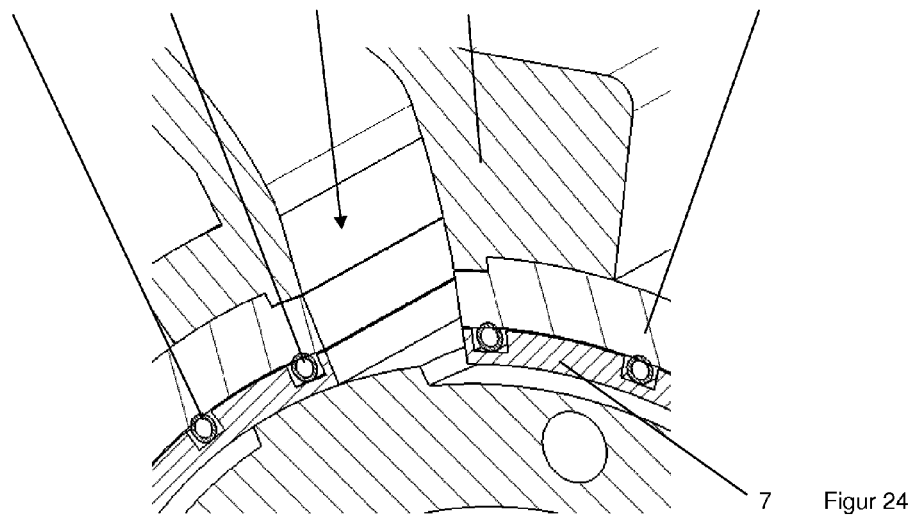
7     Figur 24

FOOD FORMING APPARATUS WITH A FOOD FEED MEMBER

The present invention relates to a food-forming-apparatus with:
a rotating drum which comprises product cavities in which a food product is formed from a food mass and
a food mass feed member, which comprises a housing with an infeed channel and at least one upstream sealing area and/or a downstream sealing area and a flexible pressure plate which is pressed against the outer surface of the drum and thereby provides a seal between the food mass member and the drum.

The drum has at its outer surface a multitude of rows of cavities.

The above mentioned food-forming-apparatus is known from the state of the art and utilized to form food products, like patties from a food mass. The drum rotates and during this rotation, the product cavities in the drum are filled at a filling position with the food mass. Subsequently, the drum will rotate further to a discharge position, in which the formed products are discharge, for example on a belt and transported away. The emptied cavities can be refilled with food mass and so on. During rotation between the filling position and discharge position the formed products is held in the cavities of the drum by a sealing unit which partially surrounds the drum. Such an apparatus is for example described in the patent application U.S. 2005 220932. However the sealing of the food forming drum described in this patent application has several disadvantages. It is constructed of many parts and is expensive to produce. Furthermore, the load of the pressure plate on the drum due to the lamellas is very high. This leads to rapid wear of the shoe and also of the surface of the drum. As a result, leakage of meat and meat juices will occur. There are also hygienic risks because many areas are difficult to access during cleaning. Inspection after cleaning is therefore difficult.

It is therefore the object of the present invention to provide a food-forming-apparatus which does not have the deficiencies of the devices according to the state of the art and provided good sealing properties, low load on the bearings and other components, a sanitary design and/or can compensate a small change of the diameter of the drum.

The problem is solved with a food-forming-apparatus with:
a rotating drum which comprises product cavities in which a food product is formed from a food mass and
a food mass feed member, which comprises a housing with an infeed channel, preferably comprising a manifold, and at least one upstream sealing area and/or a downstream sealing area and a flexible pressure plate which is pressed against the outer surface of the drum and thereby provides a seal between the food mass member and the drum,
whereas a fluid-filled device is arranged between the housing and the pressure plate.

The disclosure made regarding this embodiment of the present invention also applies to the other embodiments of the present invention and vice versa.

The present invention relates to a food-forming-apparatus, which forms food products, like patties from a food mass. This food mass is especially meat mass, for example from beef, pork, turkey or the like. The resulting food product is particularly used for the production of burgers, nuggets or the like. The drum rotates either continuously, intermittently and/or at varying speed off rotation and during this rotation, the product cavities in the drum are filled at a filling position with the food mass. Subsequently, the drum will rotate further to a discharge position, in which the formed products are discharge, for example on a belt and transported away. The emptied cavities can be refilled with food mass and so on. Preferably, the drum comprises a multitude of cavities around its circumference and more preferably a multitude of cavities which are arranged parallel to the longitudinal axis of the drum. The cavities that are arranged in parallel are preferably filled and emptied simultaneously. The drum is rotatable relative to a frame but can otherwise be stationary or movable relative to a frame of the inventive apparatus. Particularly the drum can be moved relative to the food mass member in order to preferably increase the pressure between the pressure plate and the drum.

The inventive food forming apparatus further comprises a food mass feed member, which is utilized to fill the food mass into the cavities. This food mass feed member comprises a housing an infeed channel, which is on one end connected to the food mass source and whose other end is directly adjacent to the outer circumference of the drum. The cavities are filled with the food mass by means of the infeed channel. The food mass flows, either continuously, semi-continuously or intermittently, through the infeed channel and into the cavities. The width of the inlet channel corresponds essentially to the length of the drum. The flow of the food mass through the channel is preferably synchronized with the speed of rotation of the drum.

In order to avoid food mass leakage between the food mass feed member and the drum, the inventive apparatus comprises at least one upstream sealing area and/or a downstream sealing area, which extend radially from the infeed channel upstream and/or downstream from the infeed channel. The width of the each sealing area corresponds to the length of the drum and/or to width of the infeed channel. Furthermore, the food mass feed member comprises a flexible pressure plate which is pressed against the outer surface of the drum and thereby provides a seal between the food mass member and the drum. The length of the plate preferably extends over the entire radial extension of the food mass feed member. Its width preferably corresponds at least essentially to the length of the drum. The pressure plate can comprise a multitude of parts, for example one part for the upstream- and one part for the downstream area. However, it is also possible to provide the pressure plate as one single plate with a hole in the vicinity of the infeed channel. Each pressure plate can be made from any material known by the person skilled in the art. Preferably the material is a plastic material. Preferably the material is itself abrasion-resistant and/or comprises an abrasion resistant coating. According to the present invention each pressure plate is flexible, i.e. each pressure plate is rather thin and/or made from a flexible material. Flexible according to the present invention means, that the pressure plate can be deformed by the drum during its rotation and under the pressure typically applied. This assures that local differences in the diameter of the drum, for example due to production tolerances, can be at least partially compensated. The pressure is always at least partially in contact with the outer surface of the drum so that leakages between the drum and the food mass feed member is avoided. The pressure plate is preferably preformed, preferably in the shape of a segment of a circle.

The food mass feed member furthermore comprises a housing. In or at this housing preferably the infeed channel and the pressure plate(s) are placed. The housing can be made of a metal-, for example stainless steel or a plastic material, for example an at least partially fibre reinforced plastic material. The stiffness of the housing is preferably significantly higher than the stiffness of the pressure plate. Preferably, the housing essentially does not deform, neither elastically nor plastically, during normal operation conditions.

According to the present invention, the apparatus further comprises a fluid filled device which is arranged between the housing and the pressure plate, particularly adjacent to the surface of the plate which is opposite from the surface that is in contact with the drum. This device is preferably at least partially, more preferably entirely surrounded by the housing with the exception of the surface of the device which is in contact with the pressure plate. The device is preferably, at least partially made from a flexible material. Preferably, the device is a bag, which can be hermetically closed or which has a connection to a pressure source. The device is, according to the present invention, filled with a fluid. This fluid is preferably at least essentially not compressible. An example for a not compressible fluid in the sense of the present invention is any liquid, for example water, oil or the like. A fluid according to the present invention is also a visco-elastic fluid, for example a gel. A fluid according to the present invention is also a solid matter, which becomes liquid under a certain conditions, particularly temperature-, pressure- and/or shear-stress-conditions, for example a paste.

The food mass feed member can be stationary or at least partially movable relative to a frame of the inventive apparatus. Particularly the housing can be moved, at least partially relative to the drum in order to preferably increase the pressure between the pressure plate and the drum.

According to another or a preferred embodiment of the present invention, additionally to the rotation of the drum, the drum is moved relative to the food mass feed member and/or at least a part of the food mass feed member is moved relative to the drum.

The disclosure made regarding this embodiment of the present invention also applies to the other embodiments of the present invention and vice versa.

In this embodiment of the present invention, at least part of the food mass feed member, particularly at least part of the housing and/or the at least part of the drum, preferably the entire drum, are moved relative to each other in the radial direction of the drum, in order to increase or decrease the pressure between the pressure plate and the outer surface of the drum and/or in order to adjust the distance between the pressure plate and the outer surface of the drum.

Preferably, the relative position between the food mass feed member and the drum is automatically adjusted. A sensor detects for example the pressure between pressure plate and the outer circumference of the drum, the energy take-up of the motor that rotates the drum, the leakage rate or forces at the bearing of the food mass feed member and/or the drum and based on this signal adjusts the relative position between at least part of the food mass feed member and at least part of the drum. The following disclosure applies to all embodiments of the present invention, respectively.

Preferably, the pressure inside the fluid-filled device is adjustable, preferably automatically adjustable. A sensor detects for example the pressure between pressure plate and the outer circumference of the drum, the energy take-up of the motor that rotates the drum, the leakage rate or forces at the bearing of the food mass feed member and/or the drum and based on this signal the pressure between the pressure plate and the drum is adjusted.

In a preferred embodiment of the present invention, the inventive apparatus comprises a multitude of devices and/or that at least one device comprises a multitude of compartments. This preferred embodiment of the present invention has the advantage, that different zones of pressure between the pressure plate and the outer circumference of the drum can be provided. For example, the pressure in the direct vicinity of the infeed channel is preferably higher than the pressure in regions further upstream of downstream of the infeed channel. Additionally or alternatively, the pressure between the pressure plate in the upstream sealing area is preferably lower than the pressure in the downstream sealing area. However other pressure distributions are also feasible.

In a preferred embodiment of the present invention, the fluid filled device and at least part of the pressure plate are provided as one part. This part can be assembled from a multitude of parts or can be integrally produced as one single part.

Preferably at least part of the infeed channel and at least part of the pressure plate are provided as one part. Even more preferred, at least part of the channel, the fluid filled device and at least part of the pressure plate are provided as one part. This part can be assembled from a multitude of parts or can integrally produced as one single part.

In a preferred embodiment of the present invention, the fluid filled device and at least part of the housing are provided as one part. This part can be assembled from a multitude of parts or can be integrally produced as one single part.

In a preferred embodiment of the present invention, the inventive apparatus comprises a sensor to detect the pressure between at least part of the pressure plate and the drum. The signal of this sensor is preferably utilized to automatically control the inventive apparatus, particularly reduce the pressure between the pressure plate and the outer surface of the drum to a minimum, at which the amount of leakage of product and/or liquid is in an acceptable range.

According to the present invention, the food mass is pumped through the infeed channel and is pressed with a certain feed pressure into the cavities of the drum. The feed pressure provided depends among others from the kind of food product, its texture, its temperature, and/or the flow rate of the food mass. Preferably, pressure between the pressure plate and the outer circumference of the drum is controlled based on the feed pressure of the food mass.

According to another or a preferred embodiment of the present invention, the infeed channel expands from its inlet to its outlet, particularly in the longitudinal direction of the drum. Preferably, the ratio between inlet and outlet is <0.75, preferably <0.5 and even more preferably <0.45.

The disclosure made regarding this embodiment of the present invention also applies to the other embodiments of the present invention and vice versa.

According to another or a preferred embodiment of the present invention, the width of the infeed channel, particularly adjacent to the drum, is essentially equal to the radial distance between two product cavities.

The disclosure made regarding this embodiment of the present invention also applies to the other embodiments of the present invention and vice versa.

According to another or a preferred embodiment of the present invention, the food mass feed member comprises a filler, preferably within the food mass feed member.

The disclosure made regarding this embodiment of the present invention also applies to the other embodiments of the present invention and vice versa.

In the present embodiment of the invention, a filler is situated in the housing of the food mass feed member. The filler preferably fixes and/or presses the flexible pressure plate against the drum. Preferably, the filler is solid, for example made from a plastic material, and more preferably from a food approved plastic material such as PUR or PE. More preferred, the filler is a foam material. Preferably, the foam is injected into the housing. Alternatively or additionally the filler is not solid, preferably a liquid, for example a gas, water, oil and/or a gel. The pressure of the non liquid filler is preferably adjustable, for example in order to adjust the pressure of the pressure plate against the drum. Preferably, the inner volume of the housing comprises different fillers, for example a solid and a non solid filler. Therefore, the inner volume preferably comprises different zones, which extend preferably over the entire length of the housing parallel to the centre axis of the drum. The zones can be filled with the same or different solid and/or non solid fillers. Preferably, the pressure plate, the manifold and/or the filler are designed as one part, gives provides an improved sanitary design.

Preferably, the housing comprises on or more recesses, preferably a recess that extend radially from the drum and more preferably at least essentially over the entire length of the drum. More preferably, the recess is deformation recess, which acts like a spring an elastically pushes the pressure plate against the drum. The width of the recess is preferably designed such, that it is, preferably, wide enough to be cleaned and/or inspected, but small enough so that the pressure plate does not deform in the region of the recess. In order to alter the stiffness of the filler, a plate or the like can be inserted into the recess. Preferably, the pressure plate comprises one or more fins, which is/are, at least partially inserted into the recess.

According to a preferred or another embodiment of the present invention, the housing is, at least partially, produced by rotational moulding.

The disclosure made regarding this embodiment of the present invention also applies to the other embodiments of the present invention and vice versa.

Preferably, the housing, the manifold, the channel, the filler, and/or the recess are one single rotational moulding part. The structure can be reinforced, for example with metal and/or a plastic material, for example, fibre reinforced plastic or a composite material, like carbon fibre.

According to a preferred or another embodiment of the present invention, the inlet for the food mass into the food mass member is located on one or both front edge(s) of the food mass feed member.

The disclosure made regarding this embodiment of the present invention also applies to the other embodiments of the present invention and vice versa. Preferably, the inlet is, at least essentially, parallel to the axis of rotation of the drum.

According to another or a preferred embodiment of the present invention one or multitude of spring element(s) are used to apply a force on the pressure plate. Each spring element can for example be an O-ring with a round cross section but a spring element with another cross sections is also feasable. Around the infeed channel a combined seal and spring element is preferred to press the pressure plate against the outer surface of the drum and to prevent leakage of mass between the housing and the pressure plate. Upstream and/or downstream a spring elements is preferably utilized.

The force of the spring element(s) can be changed by changing the material and/or hardness of the spring elements. The force on the outer surface of the drum will be for example higher with spring elements of 90 Shore than with spring elements of 70 Shore.

In a preferred embodiment, the spring element is an inflatable element, for example a hollow cord with more preferably a round cross section. The element is preferably inflated with a pressurized fluid, for example air or water. Other cross-sections of the inflatable element are possible too.

Additionally or preferably, the spring element has a sealing function to avoid that food mass leaks from the apparatus.

The pressure of the fluid in each spring element is preferably proportional to the pressure of the mass in the infeed channel. The pressure in each spring element is preferably adjustable, more preferably individually adjustable, which is for example advantageous in a start-up situation but also during production. During start-up, a low pressure in the spring element is desired so that less motor torque is necessary to overcome the static friction. During production the pressure between the pressure plate and drum, e.g. the force provided by the spring element can be adjusted as low as possible to prevent wear of both the pressure plate and drum surface.

The fluid for each inflatable element will be, for example, provided via the main fluid supply which is connected to fluid connections. Via a manifold, every inflatable element is provided with fluid, preferably each at an individual pressure. The fluid can be air, water, etc.

The more the pressure elements are pressurized, the higher the force of the pressure plate on the drum surface.

According to another preferred or inventive embodiment of the present invention, the food-forming-apparatus comprises pressure means to adjust the local position of the manifold and/or the pressure-plate and/or the local pressure of the manifold and/or the pressure-plate relative to the drum.

The disclosure made regarding this embodiment of the present invention also applies to the other embodiments of the present invention and vice versa.

According to this embodiment of the present invention, the apparatus comprises pressure means, for example piston/cylinder arrangements, which adjust the local position of the manifold, the stabilization element and/or the pressure-plate and/or the local pressure of the manifold, the stabilization element and/or the pressure-plate relative to the drum. Preferably, the apparatus comprises a multitude of pressure means, which are located side by side parallel to the axis of rotation of the drum. With these pressure means it can be achieved that the distance between the manifold, the stabilization element and/or the pressure plate and the drum is at least essentially the same over the entire length of the drum or differs over the length of the drum. By varying for example to which degree the piston extends out of the cylinder, the local position of the manifold, the stabilization element and/or the pressure plate is adjusted. Additionally or alternatively, the local pressure by which the manifold, the stabilization element and/or the pressure plate are pushed against the surface of the drum can be adjusted.

The stabilization element is utilized to stabilize the pressure plate in its form and/or to equalize the pressure provided by the pressure means. The utilization of a stabilization element can, for example, assure that the pressure plate is not pressed into the cavities of the drum. The stabilization element can be made from the same or a different material than the pressure plate. Preferably, the stabilization element and the pressure plate are separate parts. However they can also be one single piece.

Preferably, the pressure means, for example the piston/cylinder arrangements, in one row are subjected to the same pressure source. This assures that the local pressure along the longitudinal extension of the drum is at least essentially the same. Alternatively, the pressure of each pressure element or a multitude/group of pressure elements is individually contolled.

The piston/cylinder arrangements are preferably operated with compressed air.

According to this embodiment of the present invention, the apparatus comprises a cutting member which is pressed against the drum by pressure means to adjust the local position and/or the local pressure of the cutting member.

The disclosure made regarding this embodiment of the present invention also applies to the other embodiments of the present invention and vice versa. Particularly reference is made to the description of the embodiment of the present invention made right above.

According to another embodiment of the present invention the pressure plate comprises a hinge like element.

The disclosure made regarding this embodiment of the present invention also applies to the other embodiments of the present invention and vice versa.

This hinge like element increases the flexibility of the pressure plate, so that it can adopt the shape of the drum and/or to the changes of the shape of the drum which occur during the operation of the food forming apparatus.

The hinge like element can be a notch, a difference in material, a film-hinge or the like. The hinge like element can extend in longitudinal and/or circumferential direction of the drum. Preferably, there are a multitude of hinge-like elements in parallel, preferably equidistantly.

According to another or a preferred embodiment of the present, the food-forming-apparatus comprises a stabilization block and/or a cutting member and preferably the stabilization block and/or a cutting member comprise a hinge-like element.

The disclosure made regarding this embodiment of the present invention also applies to the other embodiments of the present invention and vice versa.

This hinge like element increases the flexibility of the stabilization block and/or a cutting member, so that it can adopt the shape of the drum and/or to the changes of the shape of the drum which occur during the operation of the food forming apparatus, respectively.

The hinge like element can be a notch, a difference in material, a film-hinge or the like. The hinge like element can extend in longitudinal and/or circumferential direction of the drum. Preferably, there are a multitude of hinge-like elements in parallel, preferably equidistantly.

According to yet another or a preferred embodiment of the present invention, the food-mass-feed-member comprises no holding means.

The disclosure made regarding this embodiment of the present invention also applies to the other embodiments of the present invention and vice versa.

According to this embodiment, the food mass feed member does not comprise any holding means, i.e. means, that maintain an increased pressure, for example the feed pressure, in the product cavities after they have been filled. Immediately after or even during filling, the exposure of the product cavities to ambient pressure starts. This embodiment of the present invention has the advantage that the pressure plate, particular in the down-stream circumferential direction can be designed rather short, which reduces wear and/or smearing of the product.

According to a preferred embodiment the drum comprises, at least partially porous, for example sintered, product cavities. More preferably, each cavity is connected to a fluid passage which is, for example, connected to the ambient. Preferably, all cavities in one row are connected to the same fluid passage. Via the porous cavities and the fluid passage, the cavities can be vented during filling, so that the formed food products are free of air pockets.

Preferably, the formed product is ejected out of the porous cavity with gas forced through the fluid channel.

The invention is now explained in further detail according to FIGS. 1-33. These explanations do not limit the scope of protection of the present invention. The explanations apply to all inventions, respectively.

Figure 16:
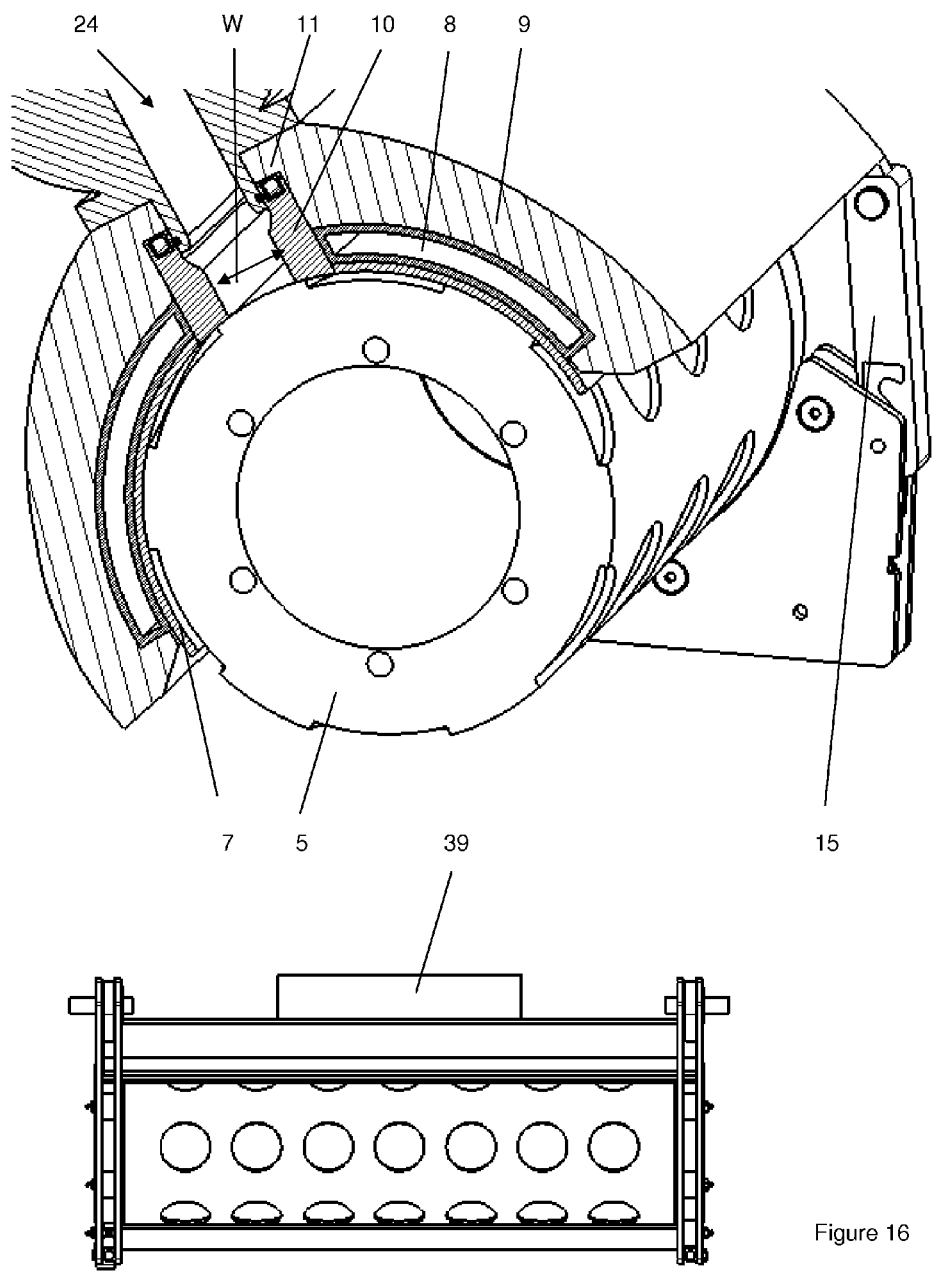
FIG. 16 shows a food mass fed member with an expanding inlet.
Figure 17:
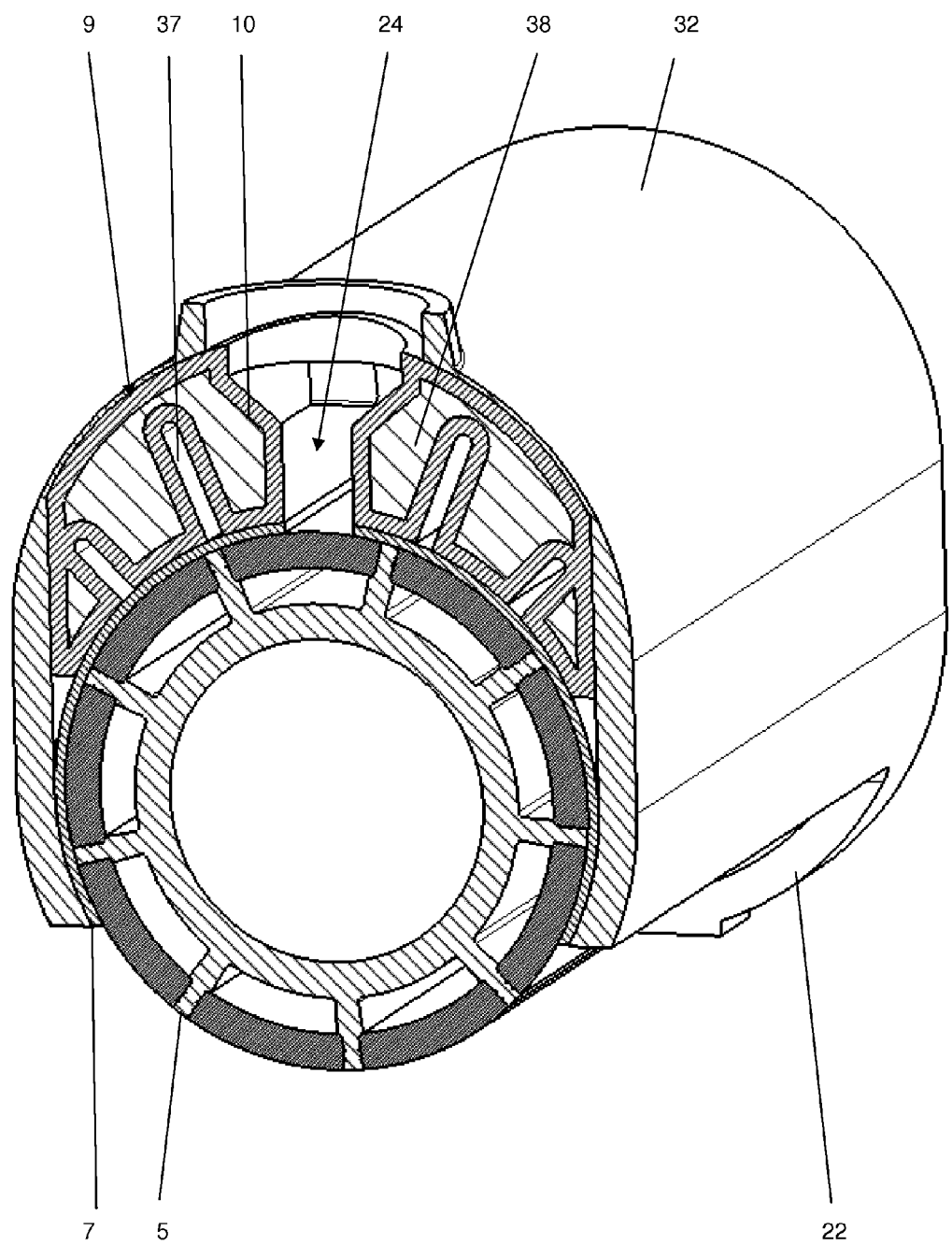
Figure 17B:
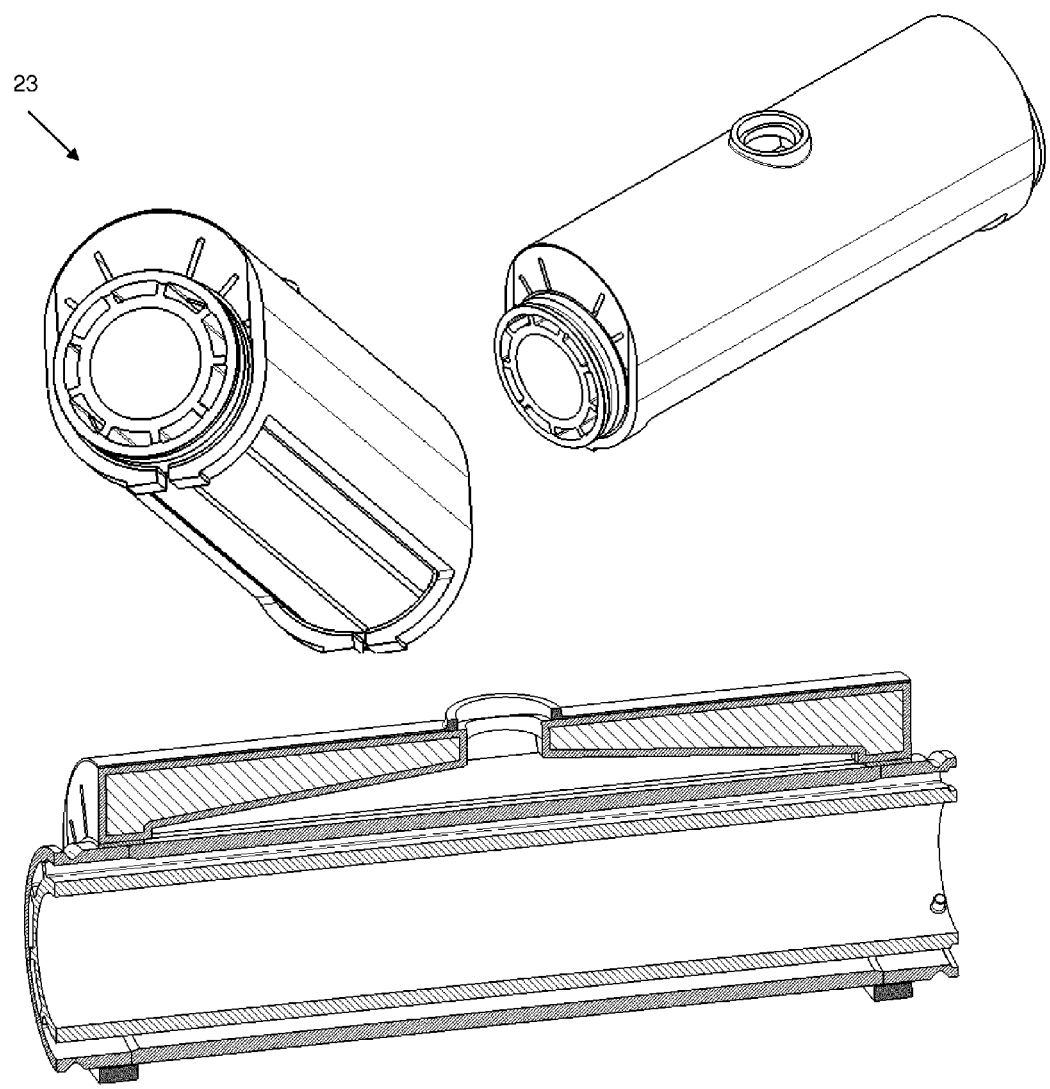
Figure 17:
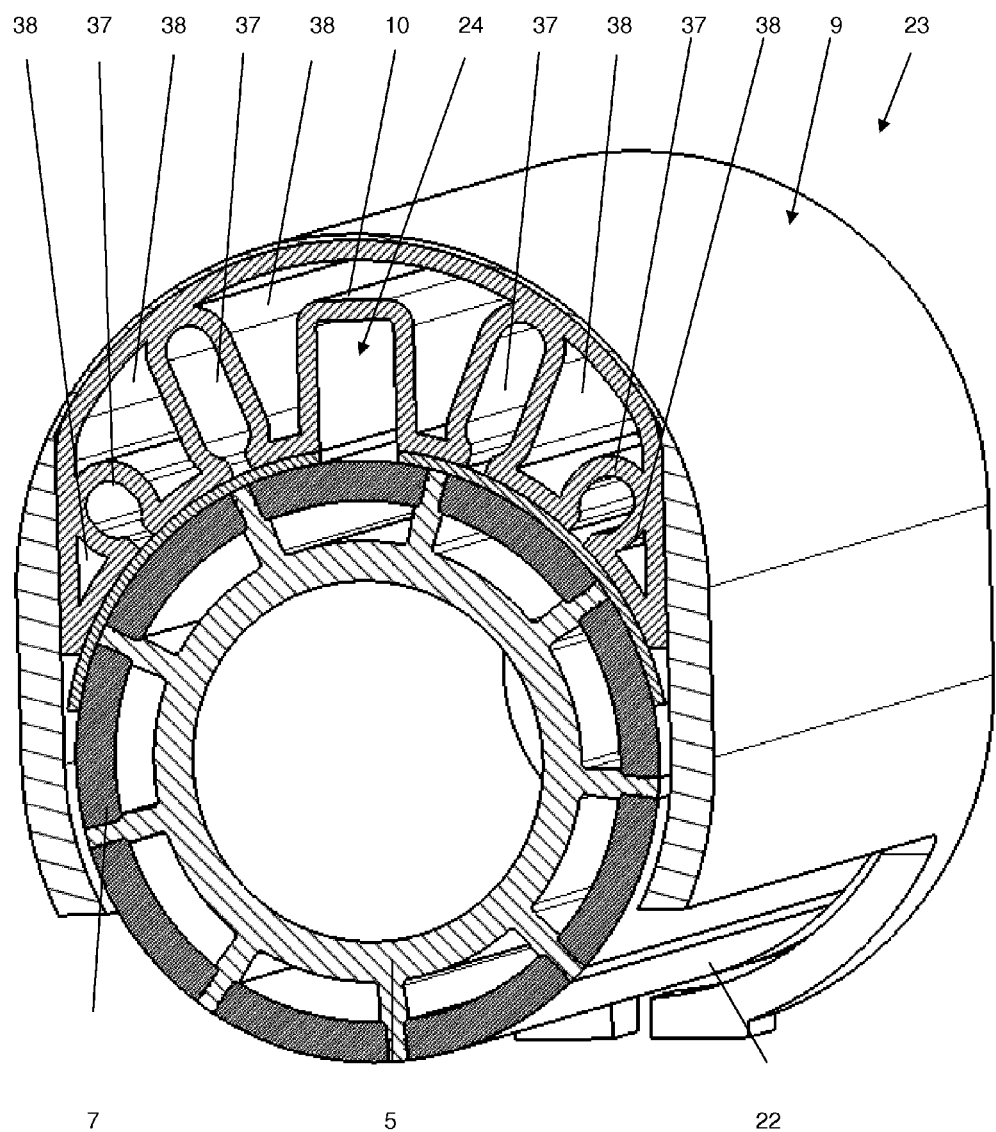
Figure 18:
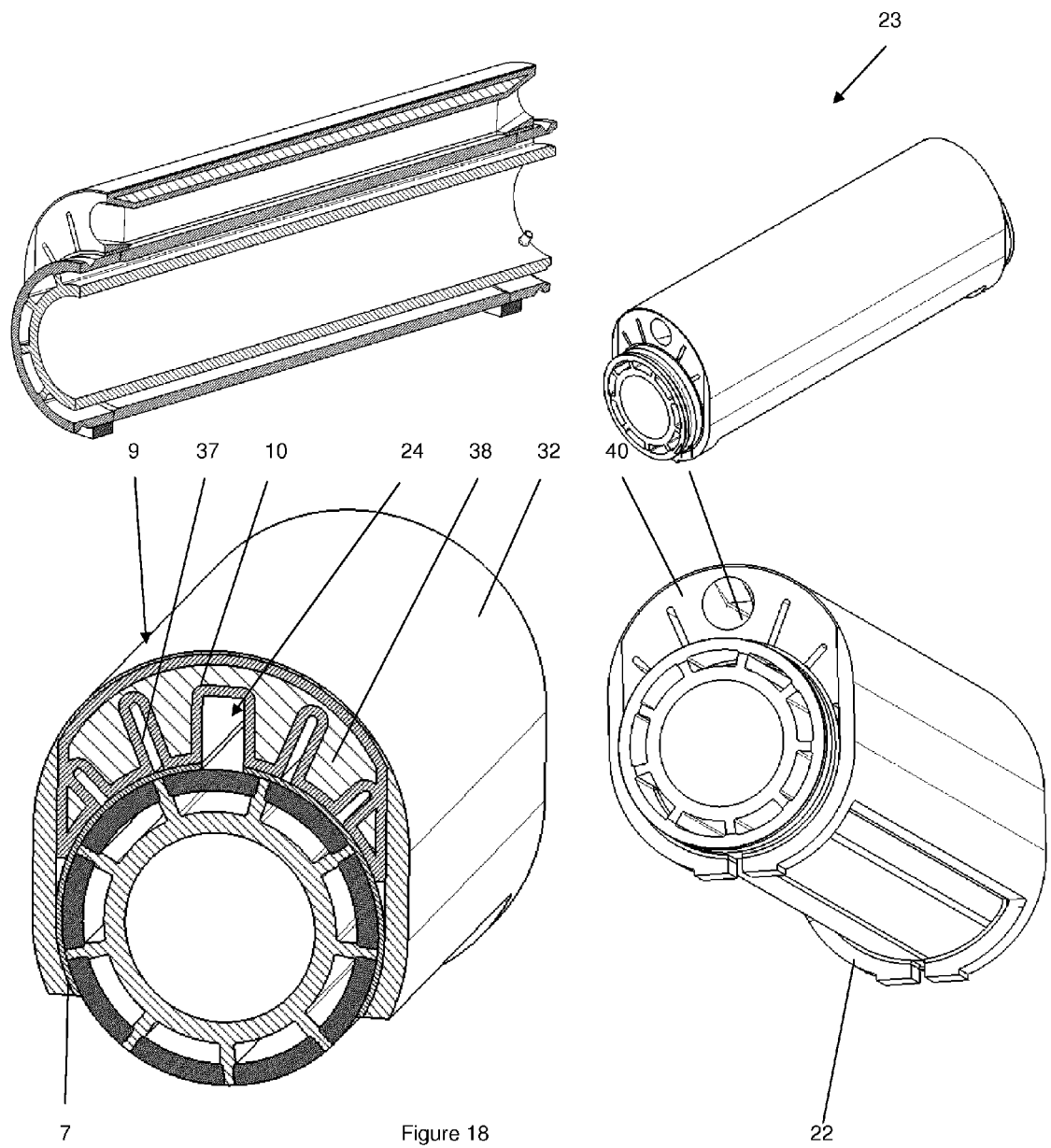
Figure 19:
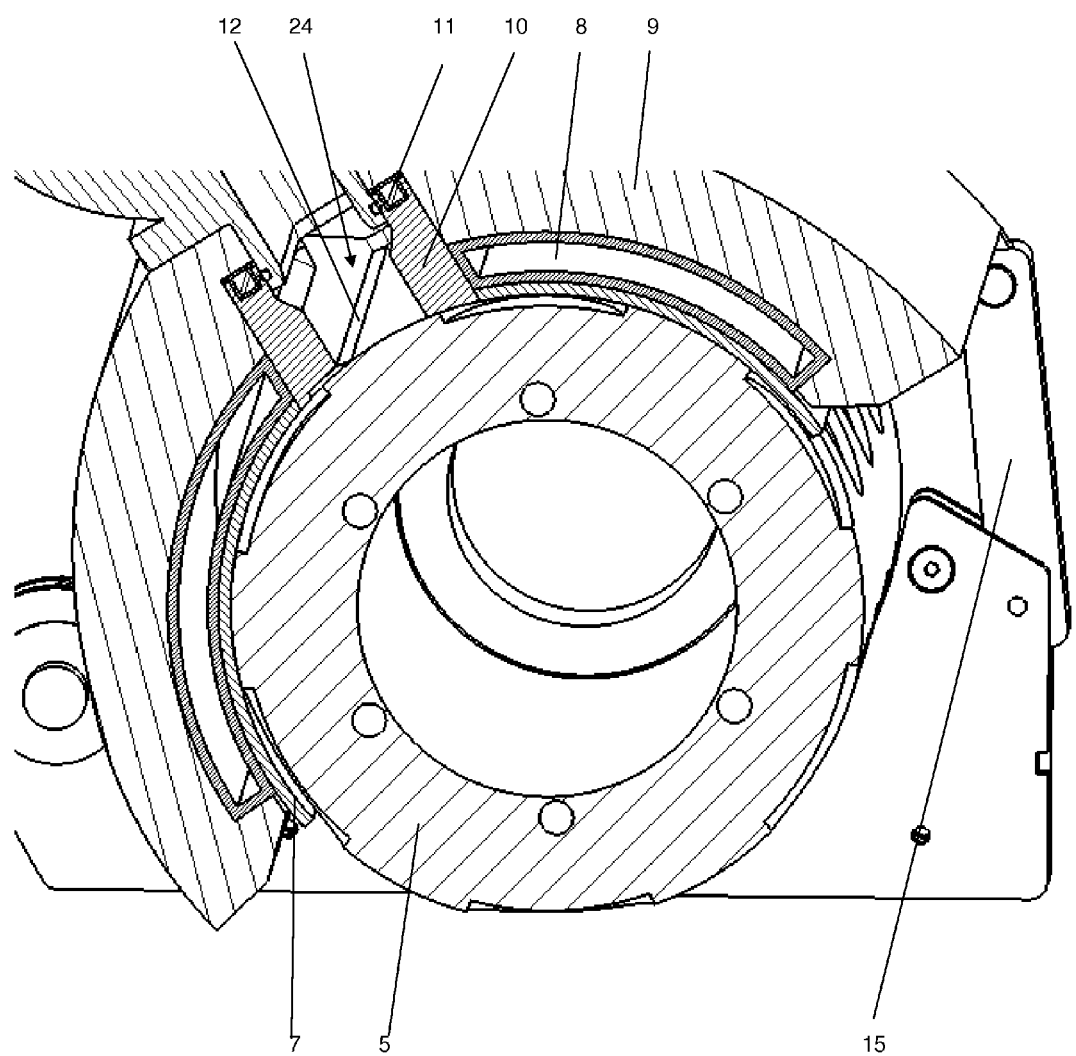
Figure 19:
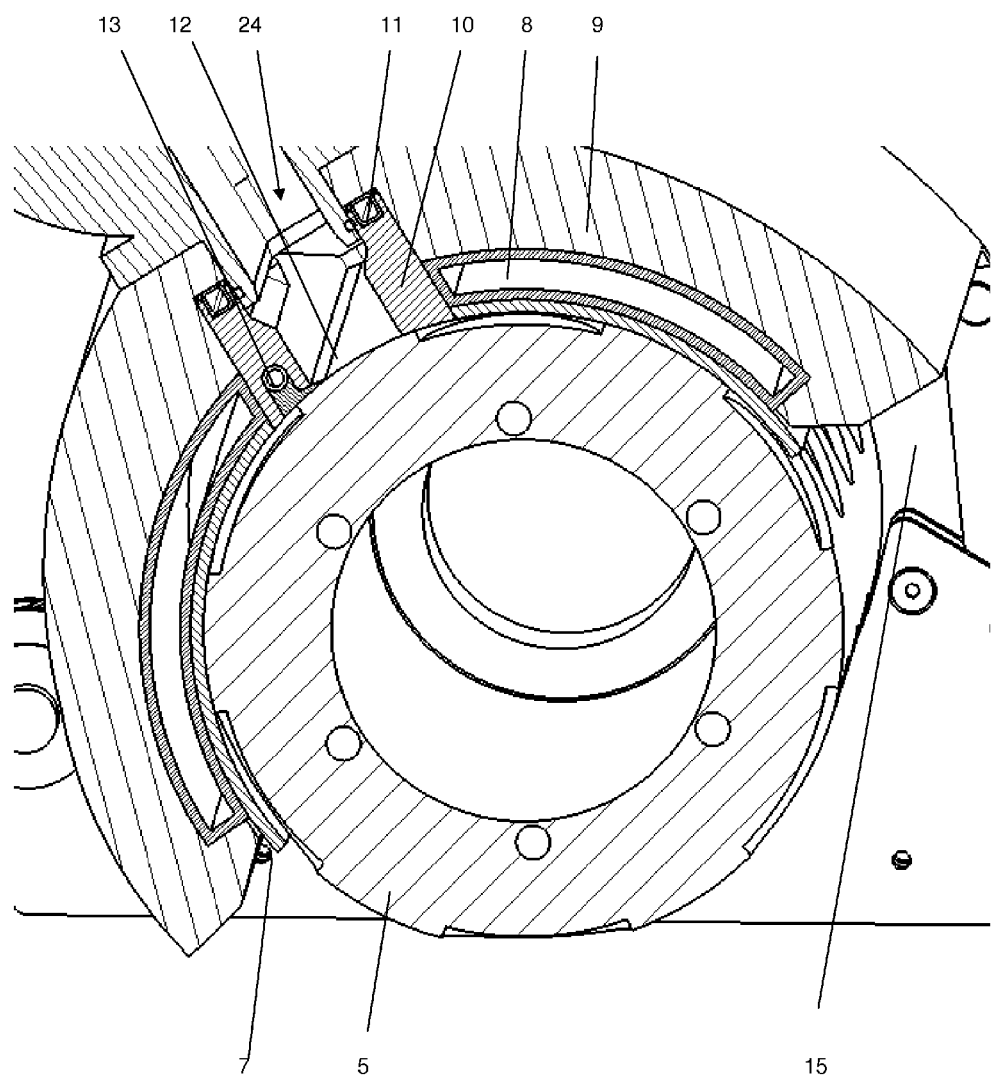
Figure 20:
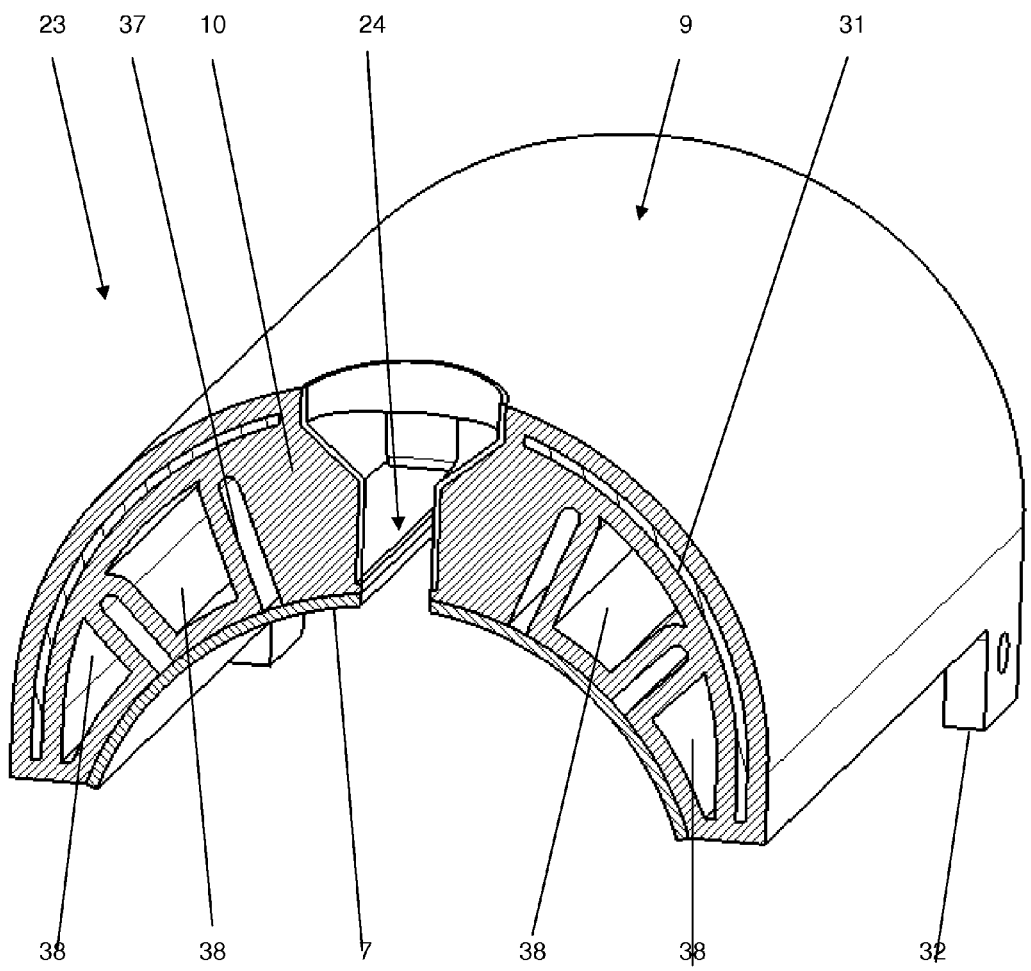

FIG. 17a-c shows a food mass feed member with a food mass inlet, filler between the pressure plate and the housing FIG. 18 shows a food mass feed member with a food mass inlet at the front edge FIG. 19 shows the embodiment of FIG. 16 provided with a cutting member FIG. 20 shows a food mass member with a food mass inlet, the use of a filler and additional reinforcement means 31

Figure 21:
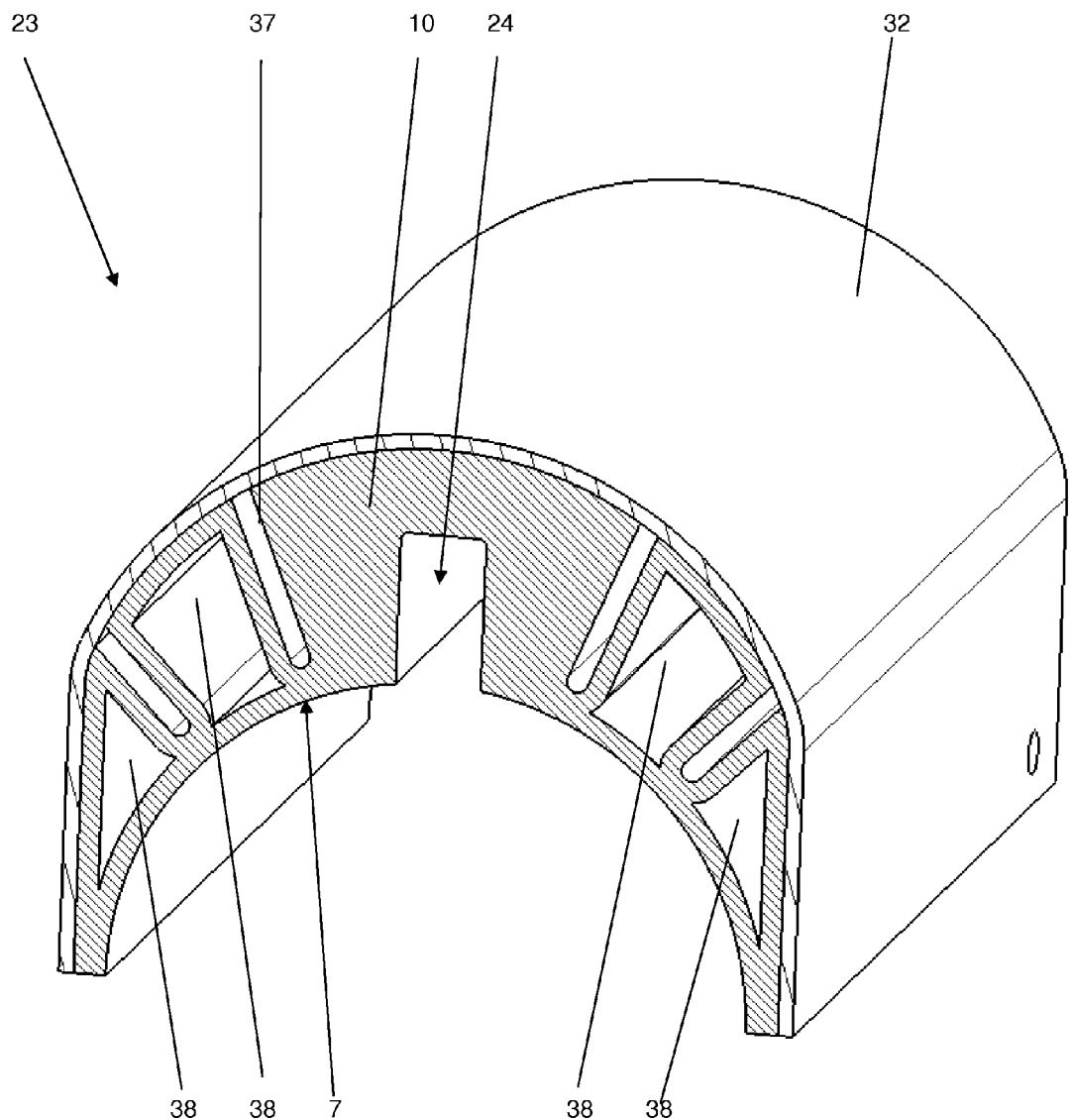
Figure 22:
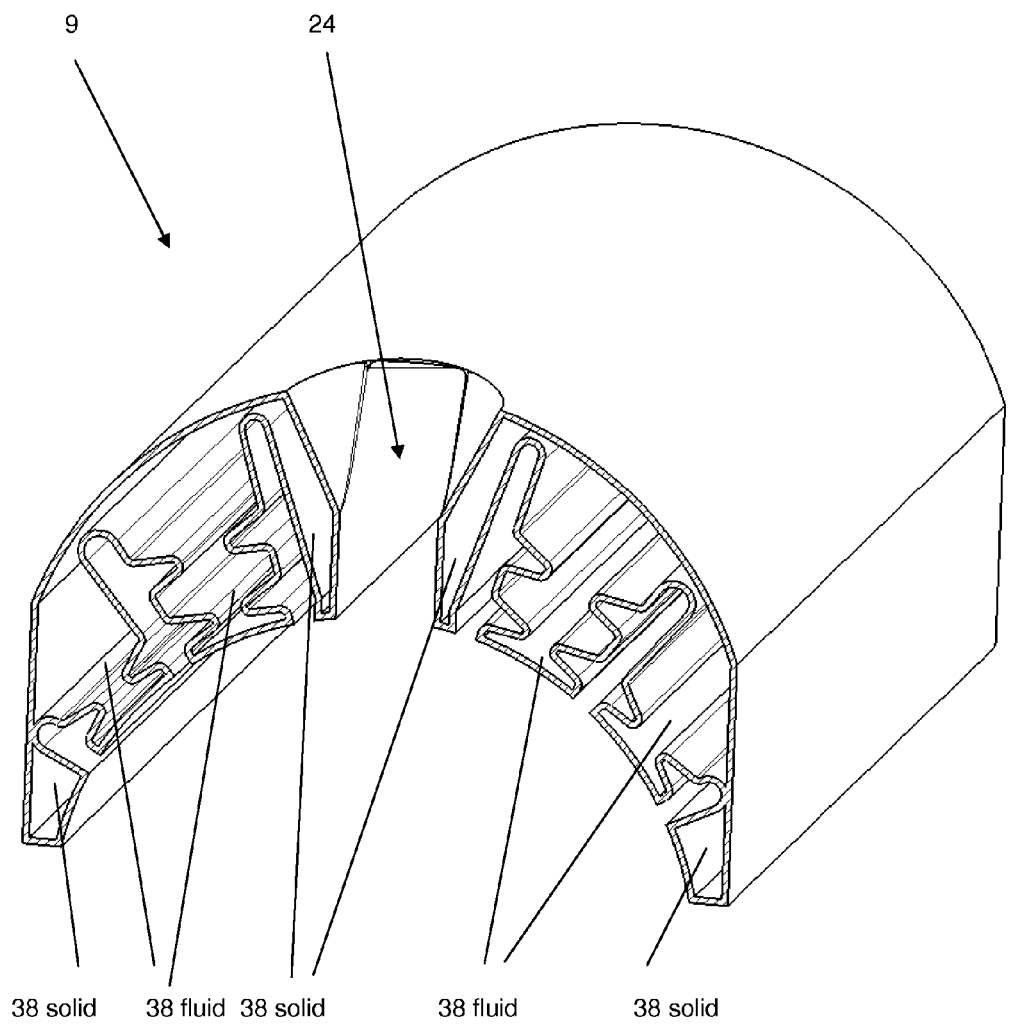
Figure 23:
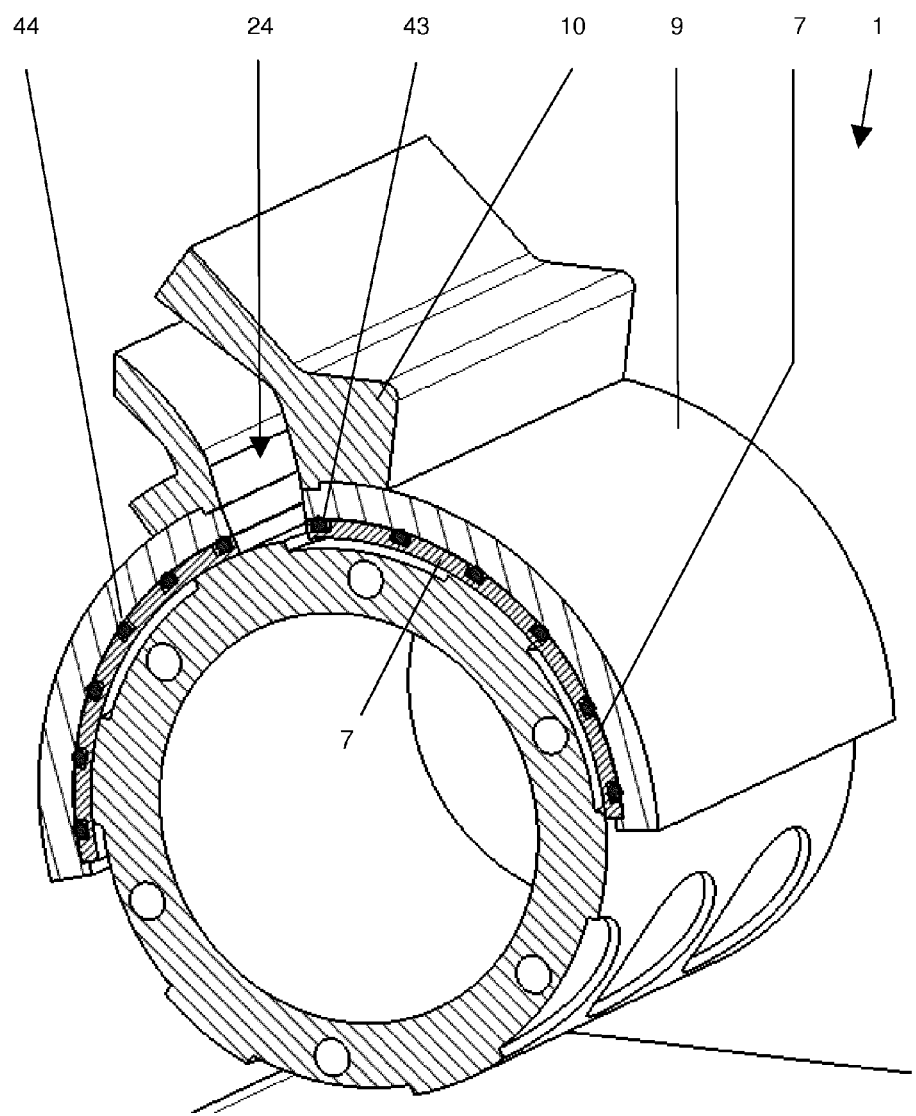

FIG. 21 shows a food mass member with a flexible plate is integrated in the housing FIG. 22 shows an embodiment with recesses in the housing filled with filler material and recesses filled with fluid FIG. 23 shows a pressure plate with spring elements.

FIG. 24 shows inflatable elements as pressure elements.

FIGS. 25-30 show a preferred embodiment of the present invention.

Figure 31:
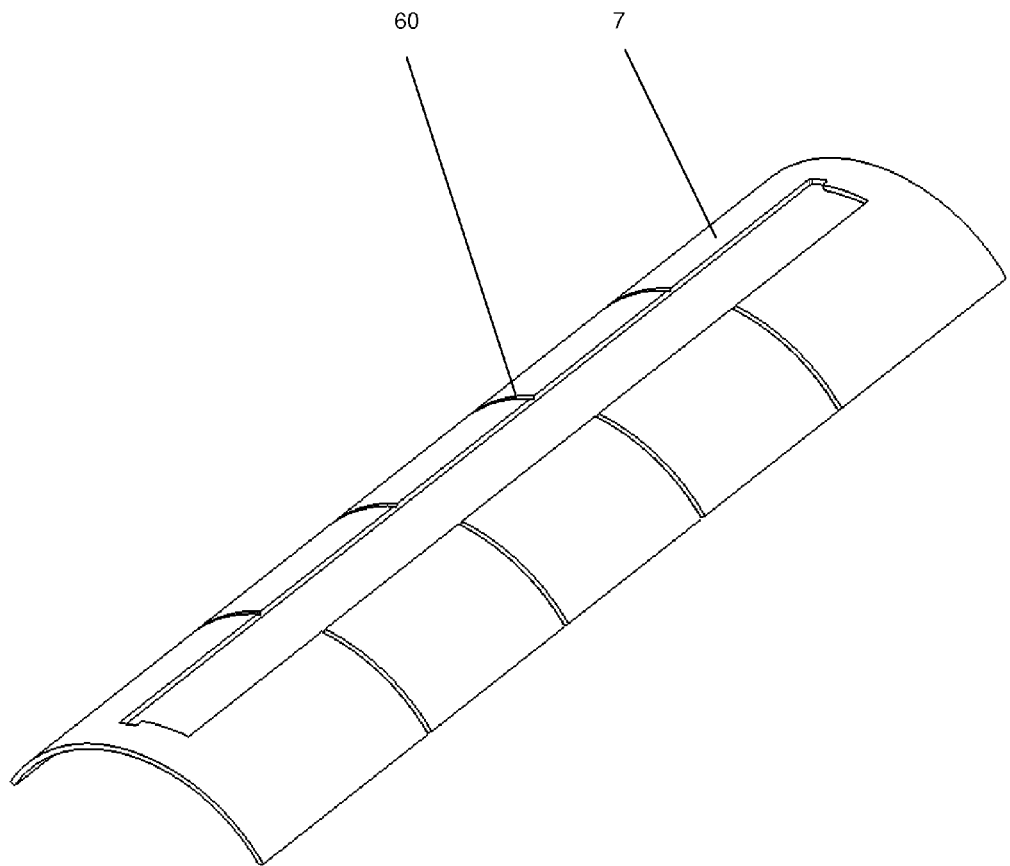

FIG. 31 shows a pressure plate with hinge like elements

Figure 32:
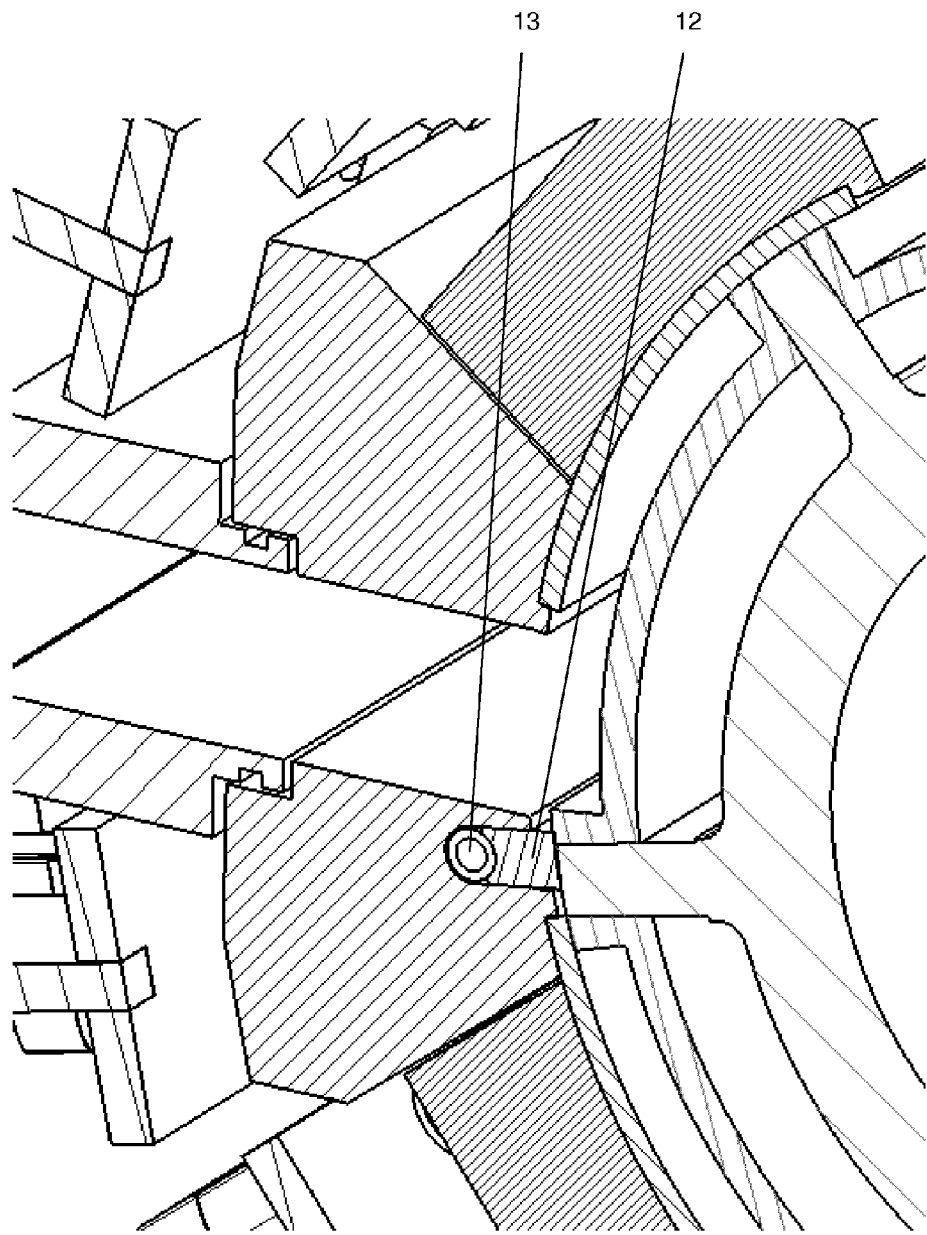
Figure 33:
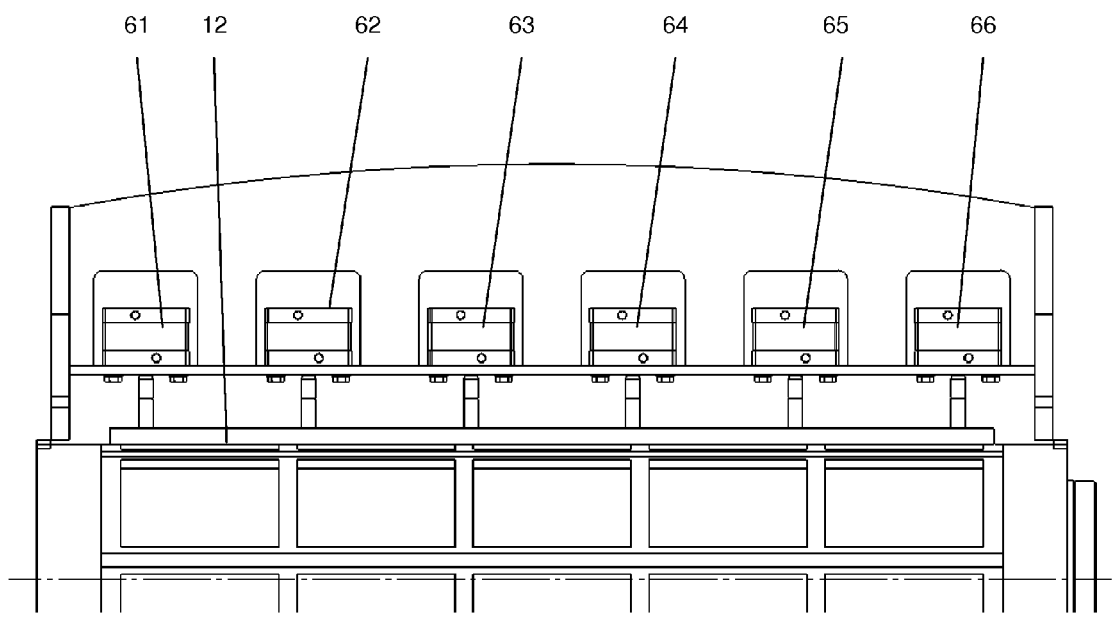

FIGS. 32, 33 show an embodiment with a cutting member.

Figure 1:
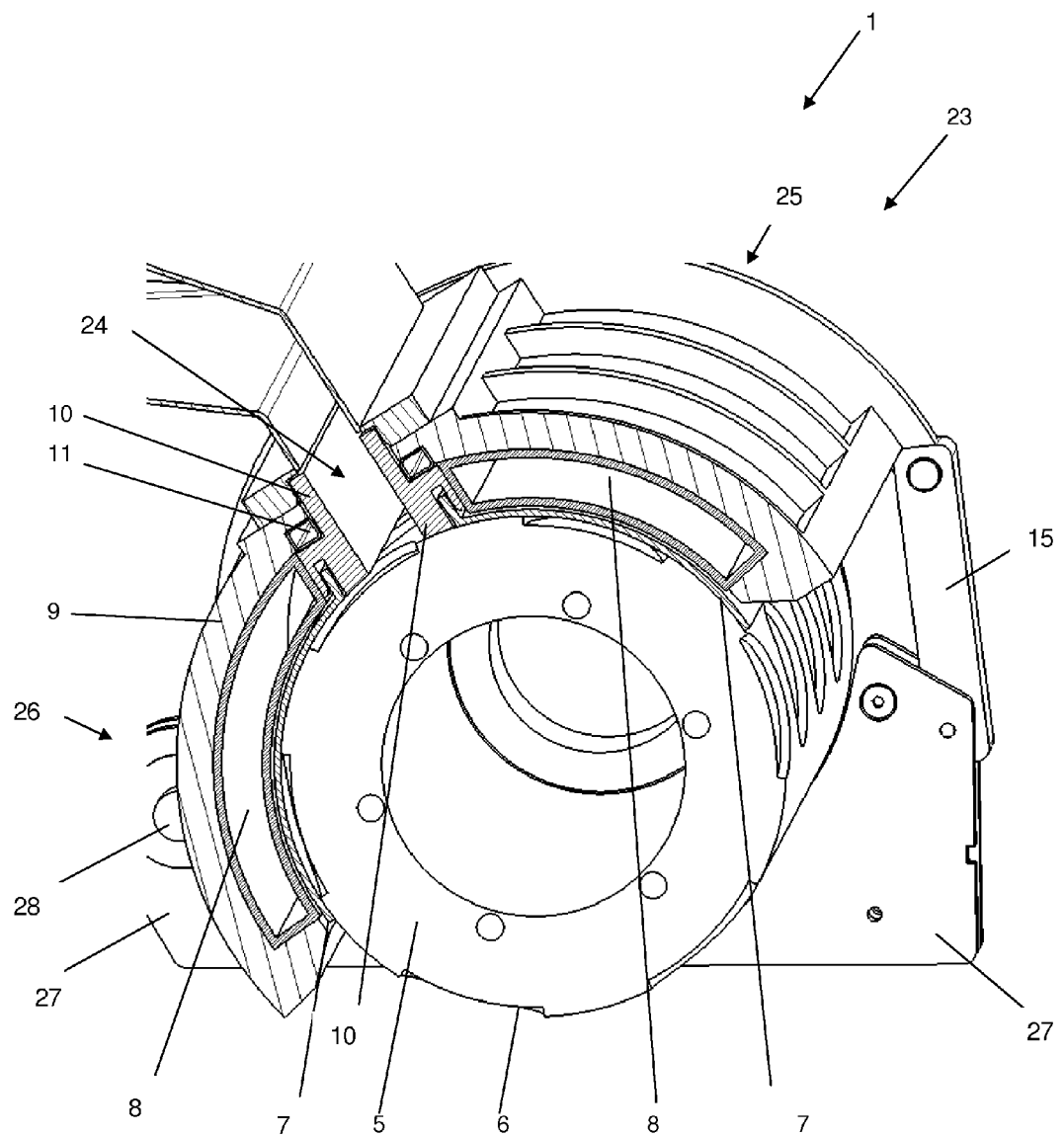
FIG. 1 shows the inventive apparatus.

FIG. 1 shows a first embodiment of the present invention. The food forming apparatus 1 comprises a rotating drum 5, which rotates in the present case counter-clockwise and is mounted rotatable at the frame 27 of the inventive apparatus 1. At the outer circumference of the drum a multitude of product cavities 6 are provided, which are filled with a food mass to form the resulting food product. Around its circumference the drum comprises a multitude cavities, here six cavities, which are spaced equidistantly. The drum further comprises a multitude of cavities, which are placed in rows side by side parallel to the axis of rotation of the drum. The cavities in each of these rows are filled and emptied simultaneously. The inventive apparatus further comprises a food mass feed member 23, whose housing 9 is, at one end mounted at the frame 27, here by means of a hinge 28. The other, preferably opposite end is also connected to the frame 27, here by means of a lever 15. Preferably, the lever is adjustable to adjust the position of the food mass feed member 23 relative to the drum 5. The housing 9 is preferably very stiff, i.e. the housing 9, at least essentially does not deform under normal operation conditions. Preferably, the housing is made from metal, more preferably steel and/or from a fibre, preferably glass-fibre reinforced plastic material. The width of the food mass feed member 23 is at least essentially equal to the length of the drum 5 The member 23 comprises an infeed channel 24, through which a food mass starting material is pumped into the cavities 6 of the drum. The infeed channel 24 comprises in the present case a manifold 10, which has here a rectangular cross section. In the present case, the manifold 10 is in direct contact with outer surface of the drum 5 and here also pressed against the drum 5 by pressure means 11, which is in the present case adjustable to adjust the pressure between the manifold 10 and the drum 5. The manifold seals the food mass feed member 23 against the drum. In order to avoid leakage between the food mass feed member 23 and the drum 5, the food mass feed member 23 comprises a pressure plate 7, here in its upstream sealing area 25 and in its downstream area 26. Each pressure plate 7 is a flexible, preferably thin, more preferably preformed plate, that extends over the entire length of the drum and which is pressed against the outer surface of the drum to avoid leakage of food particles and/or food-juice. The pressure of the manifold and/or the pressure plate(s) 7 against the drum 5 should be as low as possible; e.g. just high enough to control leakage to a desired amount. Each pressure plate 7 can be made from an abrasion-resistant material or can comprise an abrasion resistant coating. In the present case, the each pressure plate 7 is connected to the manifold 23. Due to the flexibility of the pressure plate, the pressure plate is at least partially always in contact with the circumferential surface of the drum, which reduces leakages. In order to further increase the contact area between the pressure plate 7 and the circumferential surface of the drum, the food mass feed member 23 comprises at least one, here two fluid filled devices, which are in the present case located in each of the sealing areas 25, 26. These fluid filled devices 8 are in the present case bags, which are filled preferably with an uncompressible fluid, for example water or oil. Preferably, the pressure in these devices 8 is adjustable. Due to a difference in pressure, each device 8 expands or contracts and thereby moves the pressure plate 7 in the direction of the drum or backwards and/or increases or decreases the pressure between the pressure plate 7 and the drum 5. Due to the flexibility of the device 8, the shape of the device can follow the shape of the pressure plate. The pressure in the device is preferably adjustable, preferably automatically adjustable. The pressure of each device 8 is preferably adjusted individually. The pressure in the device 8 in the downstream sealing area 26 is preferably higher than the pressure in the device 8 in the upstream area.

After the drum is positioned in the forming apparatus 1, the food mass feed member 23 will be placed around the drum. In a next step, fluid can be added to the device for example via a fluid supply unit. The pressure of the supply unit will be increased until preferably the entire inner surface of the pressure plate 7 touches the outer circumferential surface of the drum 5. Only a slight contact between the inner surface of the pressure plate and outer surface of the drum is sufficient. Another possibility is a permanent connection between the device 8 and a pressure means (not depicted), such as a hydraulic cylinder. When positioning the food mass feed member 23 around the drum, the piston is in a retracted position and the cylinder is filled with the same fluid as used in the bag. When the housing is fixed to the frame, by, for example the lever 15, the piston moves outwardly and fluid is pumped back into the device 8. The position of the piston determines the magnitude of the contact area between the inner surface of the pressure plate 7 and the outer surface of the drum 5 and/or the pressure between the pressure plate 7 and the drum 5. The adjustment of the fluid pressure inside the device 8 is preferably an automated process. By means of, for example pressure, one or more sensors, which measure preferably the contact pressure between drum and pressure plate 7, the fluid pressure can be adjusted to the appropriate value. Alternatively, preferably during an initialization phase, the drum rotates without food product being added. The friction between the pressure plate 7 and drum 5 is determined by the energy consumption, preferably the current, of the electric motor which drives the drum 5. Based on this measurement, the pressure of the fluid-filled bag can be adjusted to the appropriate value. This assures a relatively little contact pressure between the pressure plate and the drum. Consequently, there is minimal wear of the pressure plate 7 and/or the drum surface. The load on the bearings of the drum is reduced which will result in increased lifetime. The flexibility of the pressure plate 7 allows a small change of the diameter of the drum for example due to ware or machining of the surface of the drum.

Figure 2:
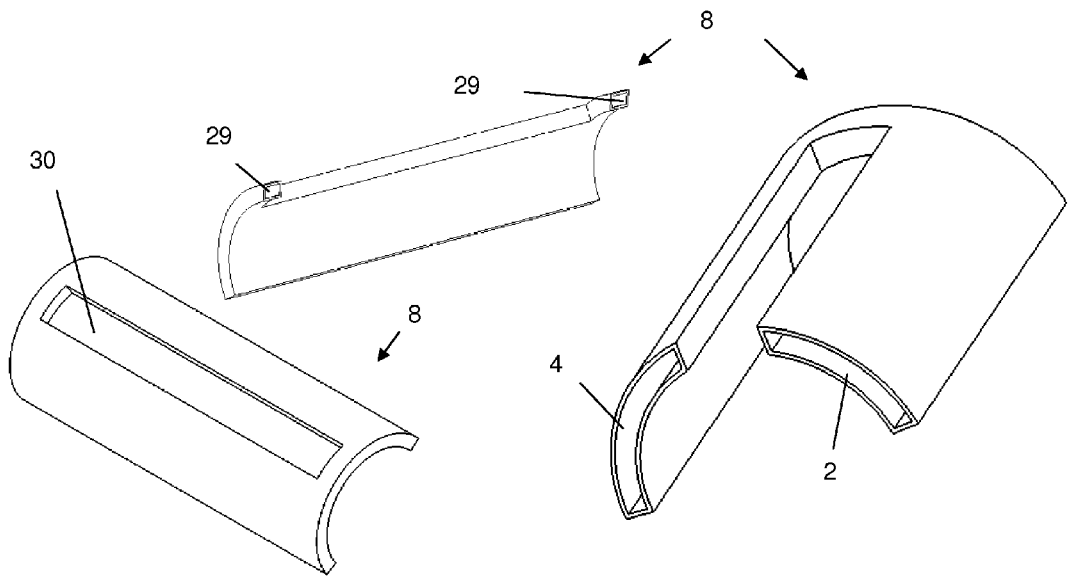
FIGS. 2-4 show different embodiments of the fluid filled device.

FIG. 2 shows one embodiment of the device 8. In the present case, the device 8 is provided as one single piece 8, which comprises an upstream compartment 2, a downstream compartment 4, which are connected by at least one here two fluid connections 29. The fluid inside the device 8 can flow from one compartment to the other. Only one pressure can be set up in the device. The device comprises an opening 30, which surround the infeed channel 24, here the manifold 10.

Figure 3:
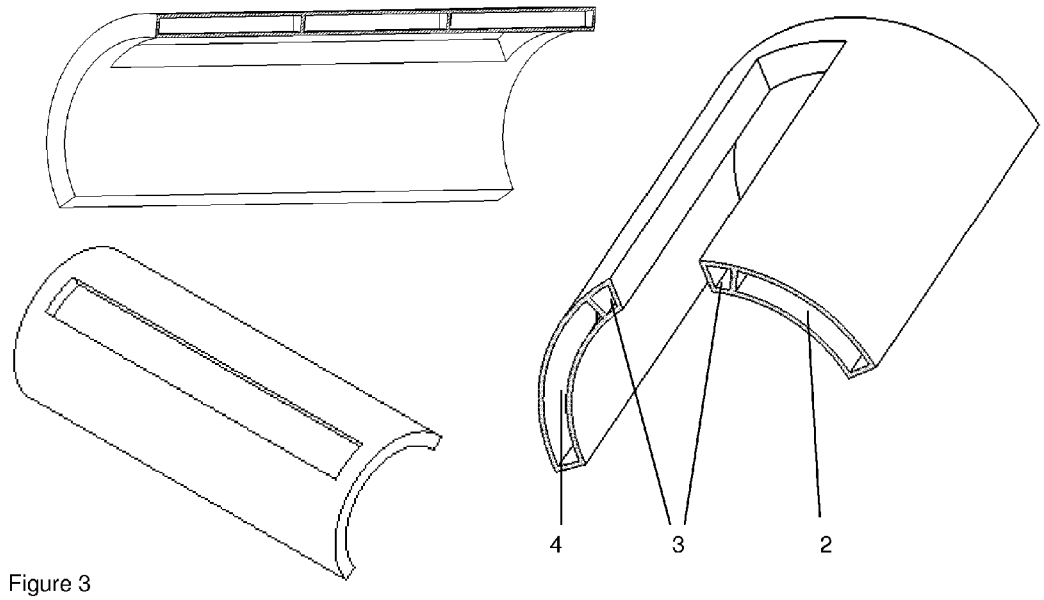

FIG. 3 depicts another embodiment of the device. Essentially, reference can be made to the embodiment according to FIG. 2. However, in the present example, the compartment 2, 3, 4 are separated. It comprises, for example, an upstream compartment 2, a filling area compartment 3 and a downstream compartment 4. Even in the longitudinal direction of the drum more compartments are feasible too. The separated compartments 2, 3, 4 allows to set up and control the pressure in these compartments individually and thus to provide different pressure zones. Minimal leakage can be achieved at minimum contact pressure between the pressure plate 7 and the drum 5.

Figure 4:
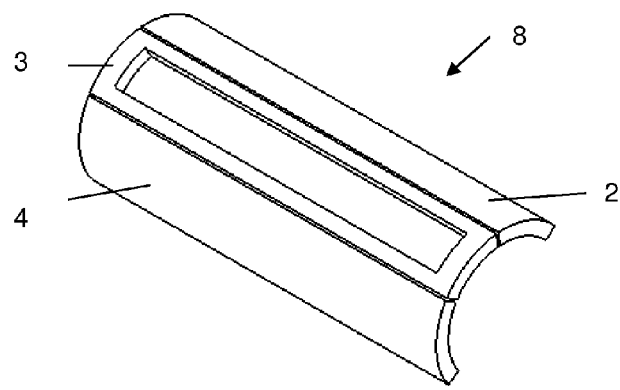

The person skilled in the art understands that a multitude of devices 8 can be utilized too. These devices may or may not be connected mechanically and/or fluid-wise. This embodiment is depicted in FIG. 4.

Figure 5:
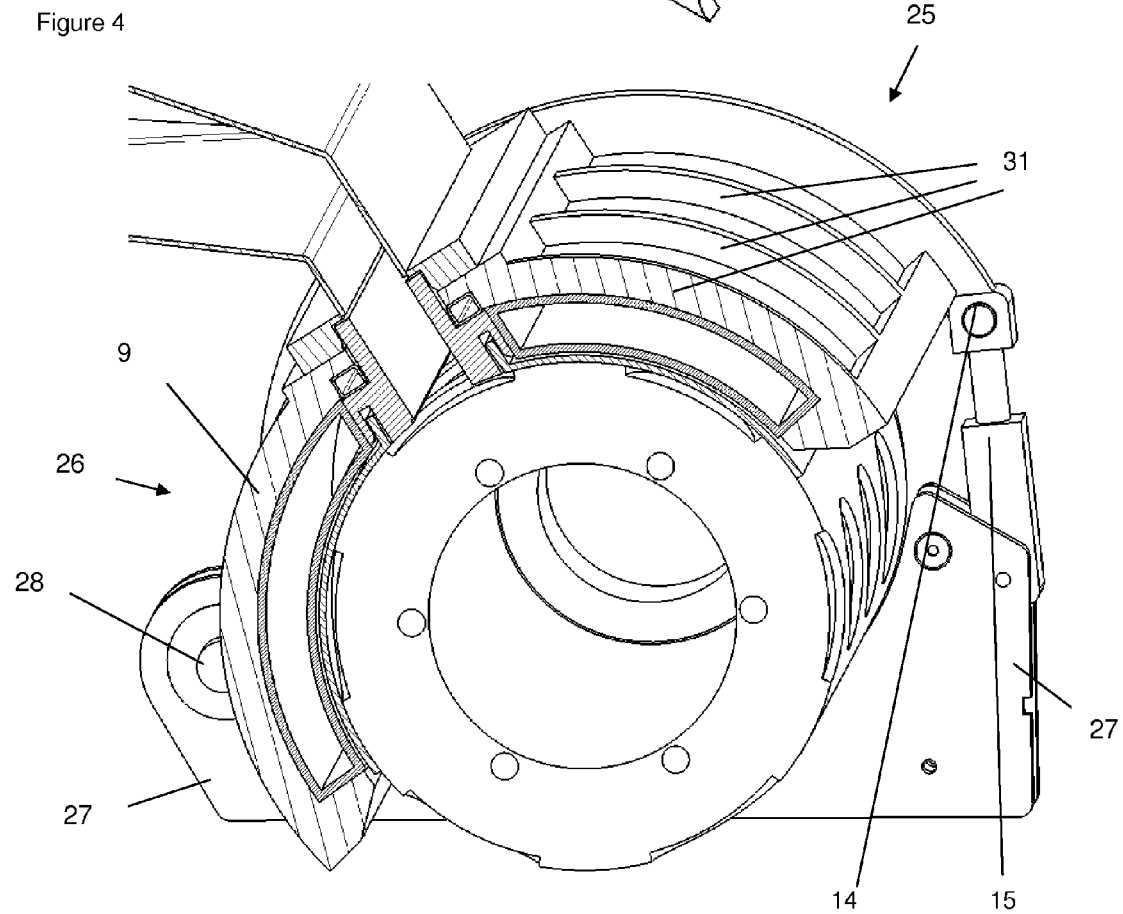
FIG. 5 shows an example how to change the position of the housing of the food mass feed member relative to the drum.

Reference is now made to FIG. 5 and FIG. 1. Preferably the housing is as rigid as possible both in circumferential direction and in longitudinal direction of the drum. Every deformation of the housing will potentially lead to a leakage between the pressure plate 7 and the drum 5. Especially, in case of long drums, e.g. 1 meter, the construction must be very rigid. Ideally, the housing has no elastic deformation when it is subjected to tension during production of food products. Referring now to FIG. 5, the housing 9 is thus provided, for example, with reinforcement means 31, here ribs 31, which extend preferably parallel to the outer circumference of the drum, particularly in the upstream- and/or downstream sealing area 25, 26. Preferably a multitude of reinforcement means 31 are provided in parallel. These reinforcement means can also be applied to the embodiment according to FIG. 1.

A lighter and still more rigid construction can be achieved by using glass reinforced materials or composite materials. There are various options to make composite material suitable for use in a food forming apparatus. The material can for example be impregnated or coated with a material (stainless steel, plastic, etc) which is suitable for use in the food industry.

FIG. 5 also depicts another embodiment of the inventive apparatus. The fluid filled devices are here pre-filled with a fixed amount of fluid and/or provided with a fixed pressure, for example ambient pressure and are sealed afterwards. The housing 9 attached at one side, here the left hand side, here by means of a hinge 28 to the frame of the apparatus and is provided at its other end with one or more joints 14 which are connected to adjustment means 15, which are attached at the frame 15. By means of the adjustment means 15, the position of the housing relative to the housing can be adjusted. Particularly, the housing can be turned around the hinge 28. The adjustment means 15 can for example be hydraulic cylinders. The used fluid in the hydraulic cylinders is preferably non compressible. By moving the housing 9 towards the drum 5, the fluid pressure inside the fluid-filled device 8 increases. Once the pressure between the inner surface of the pressure plate 7 and the outer surface of the drum 5 is as desired, the extension of the pressure means 15 is fixed. In case, there is still leakage of food product between pressure plate 7 and drum 5 during production, the fixed position of the means 15 can be changed such that the pressure in the device 8 will be further increased until leakage of food product stops. The person skilled in the art understands that the hinge 28 can be replaced by an additional adjustment means 15. In this embodiment, adjustment means are provided both on the left-hand- and on the right-hand-side of the housing 9.

Figure 6:
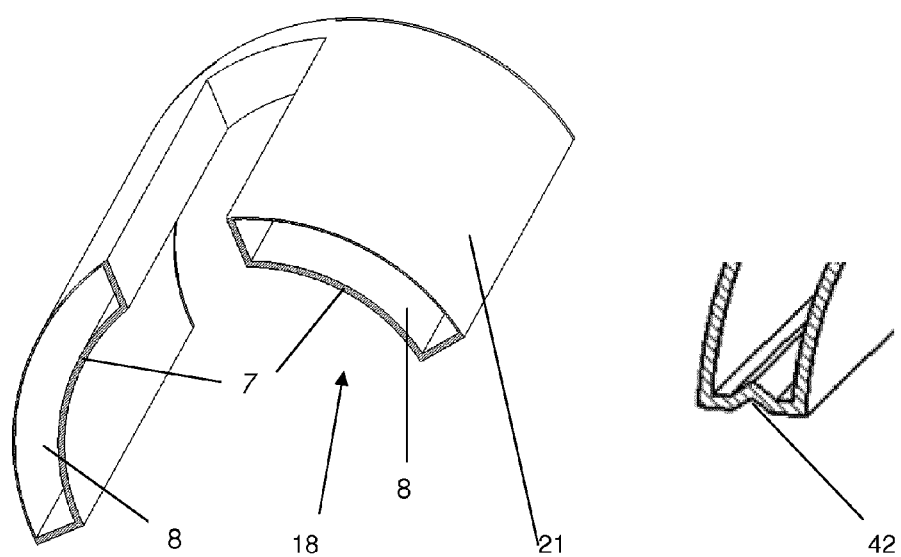
FIGS. 6-8d show different embodiments of the fluid filled device or the flexible part.

FIG. 6 depicts a preferred embodiment of the present invention, whereas the pressure plate 7 and fluid-filled device 8 are integrated in one assembly 18. Reference sign 21 refers to the upper part the assembly 18. This upper part 21 has to be so flexible that it is able to adapt its shape to the inner surface of the housing 9. Furthermore, this area 21 has to be connected leak-proof with the pressure plate 7 of the assembly. Upper part 21 and the pressure plate 7 define the fluid filled device 8.

In general, the fluid filled device may comprises means 42, for example an indentation, a notch, a groove or the like, as exemplarily shown in the right hand drawing of FIG. 6, to increase the flexibility of the fluid filled device.

Figure 7:
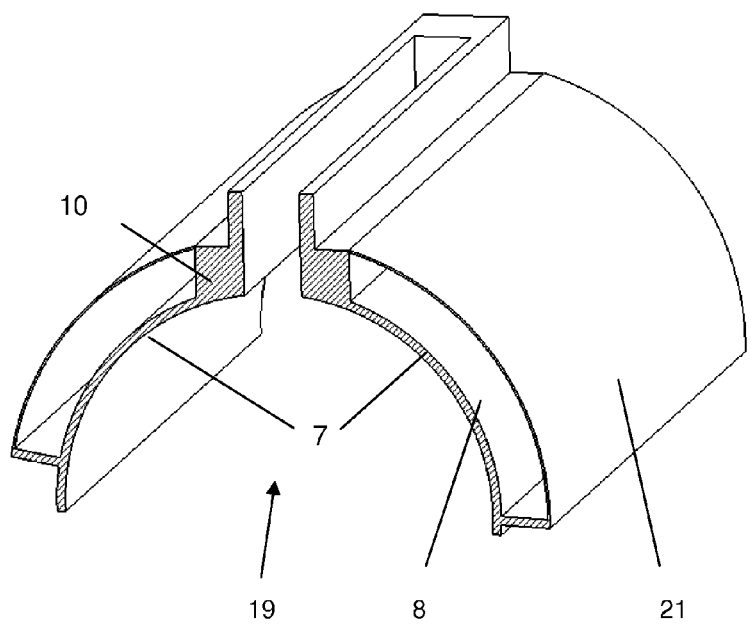

In FIG. 7, the manifold 10, pressure plate 7 and the upper part 21 can be integrated in one single assembly 19. These parts define the fluid filled device 8. The manifold part 10 and pressure plate 7 can be made out of one preferably plastic piece.

Figure 8:
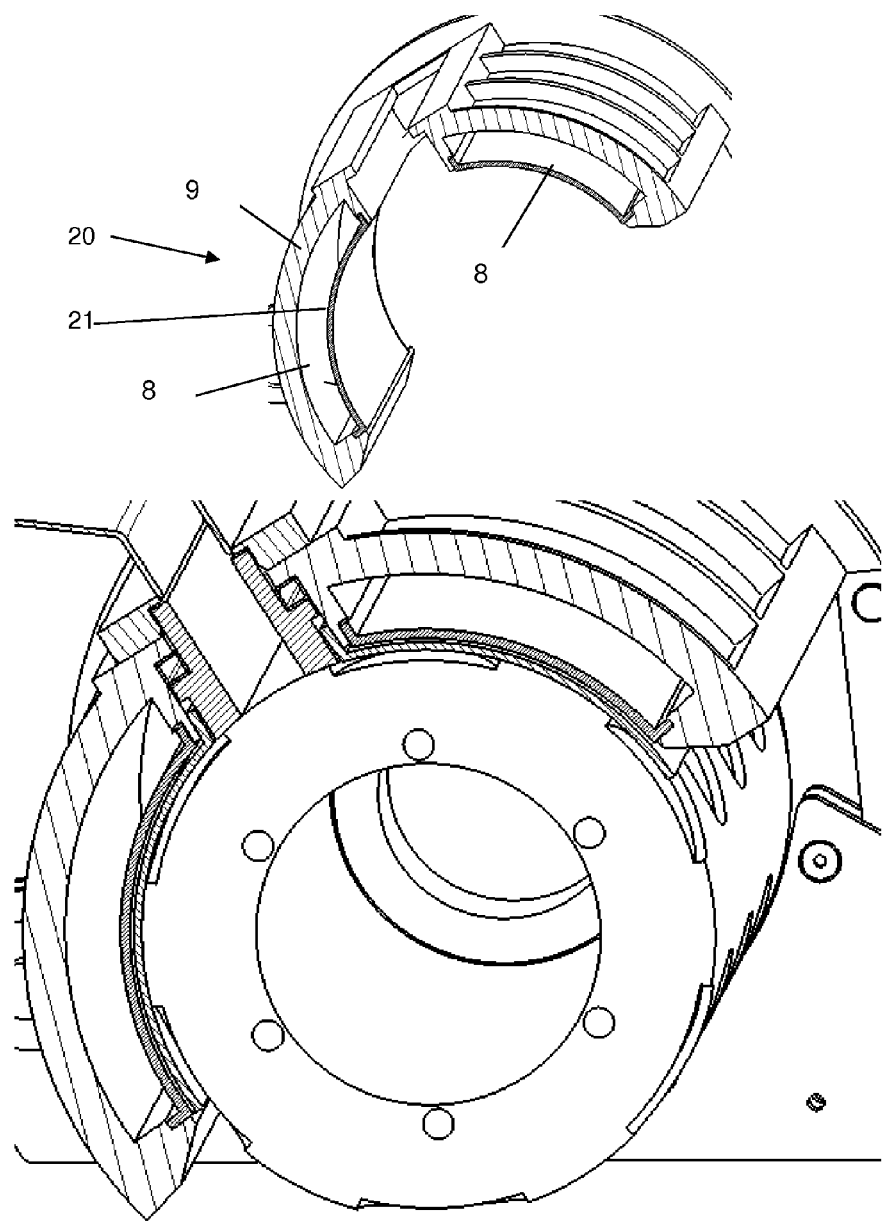

In FIG. 8 the housing 9 and lower flexible part 21 can be integrated in one single assembly. The housing 9 has to be connected leak-proof to a lower flexible part 21. These parts 9, 21 define the fluid filled device 8. This preferred embodiment has the advantage, that the housing 9 and the lower flexible part 21 are no ware parts.

Figure 8B:
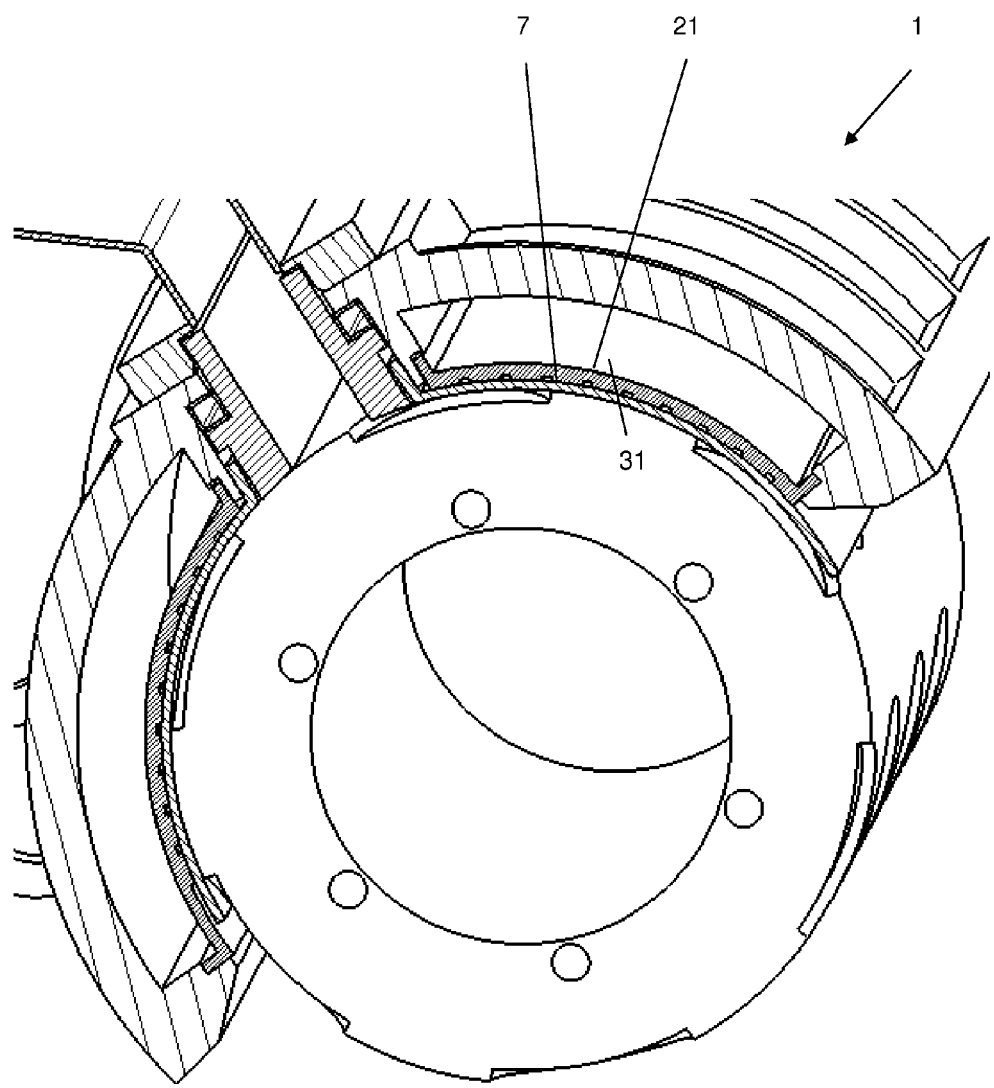

In a preferred embodiment according to FIG. 8b, the pressure plate 7 and/or the flexible part 21 may comprise one or more rib(s) 31. Each rib can extend in parallel to the axis of rotation of the drum and/or each rib can follow the circumference of the drum. The rib(s) can be utilized to reduce/increase the pressure from the flexible part 21 to the pressure plate 7 and/or to reinforce the pressure plate 7. In the embodiment according to FIG. 8b ribs are provided in the surface of the flexible part 21 that is in contact with the pressure plate 7. This increases the force exerted on the pressure plate 7 by the flexible part 21 and thus improves the sealing and/or the pressure provided can be reduced.

Figures 8C, 8D:
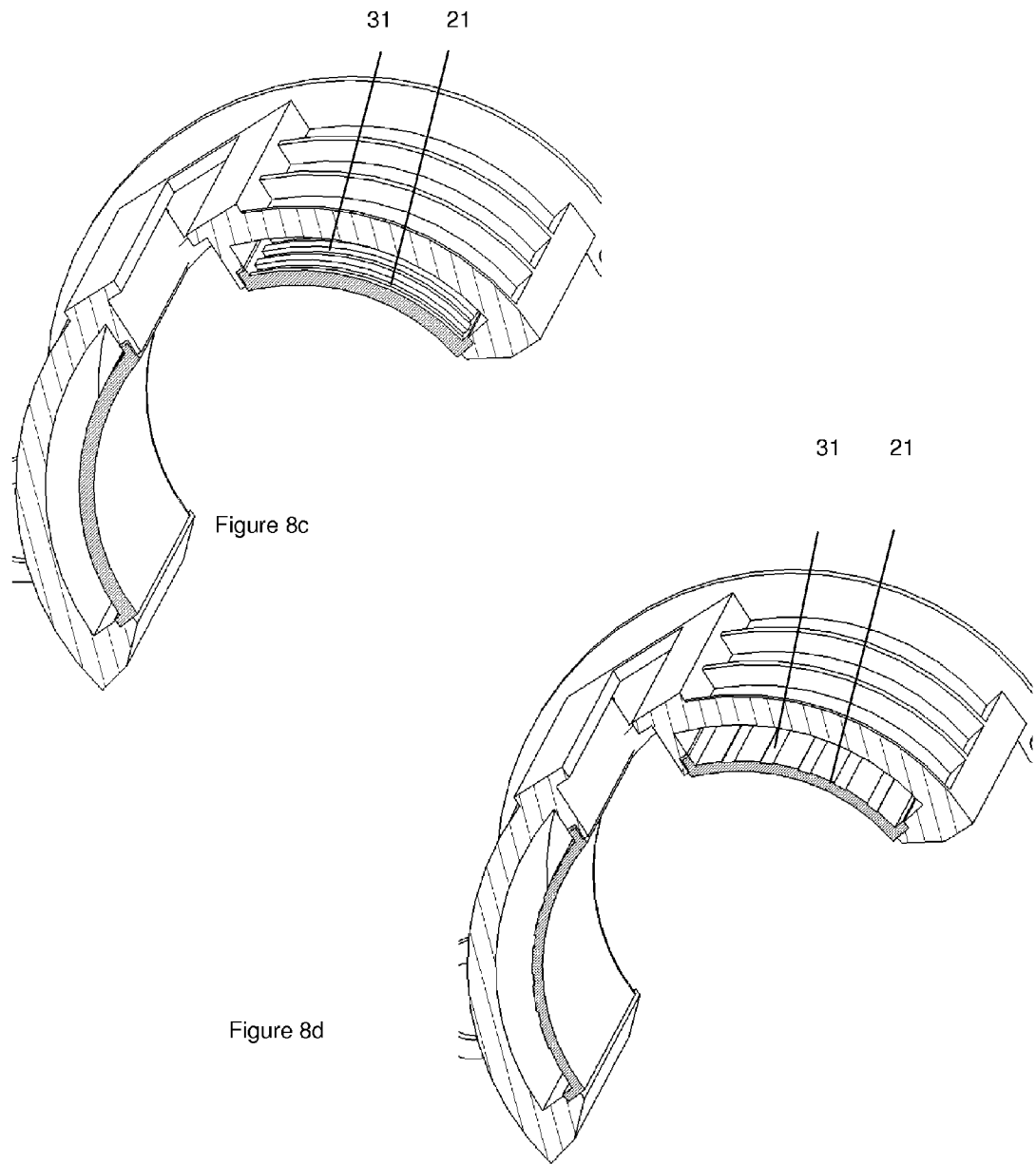

FIG. 8c shows reinforcement means 31, here a plurality of parallel ribs, in the flexible part 21 of the fluid-filled device 8, arranged in circumferential direction of the drum. The means 31 increase, for example, the stiffness of the flexible part 21. In the example according to FIG. 8d the reinforcement means 31 extend in longitudinal direction of the drum. The reinforcement means 31 can be made out of the same material as the flexible part of the fluid-filled device and/or of the pressure plate or can be made from a different material. In both examples, the reinforcement means 31 are provided at the interface between the pressure plate 7 and the fluid.filled device. The reinforcement means 31 can further be integrated into the flexible part 21 and/or the pressure plate by using steel, spring-steel, fibers, for example carbon fiber, etc. as a reinforcement of one or both these parts 21, 8. This reinforcement-material can be, for example, inserted into a mould prior to the molding process of parts 21 or 8 and/or which can be part of the molding material of these parts. The reinforcement means to prevent, for example, that the pressure plate will be pressed into the recess of the cavities. The reinforcement means are preferably only placed in a position which is subjected to undesired deformation.

Figure 9:
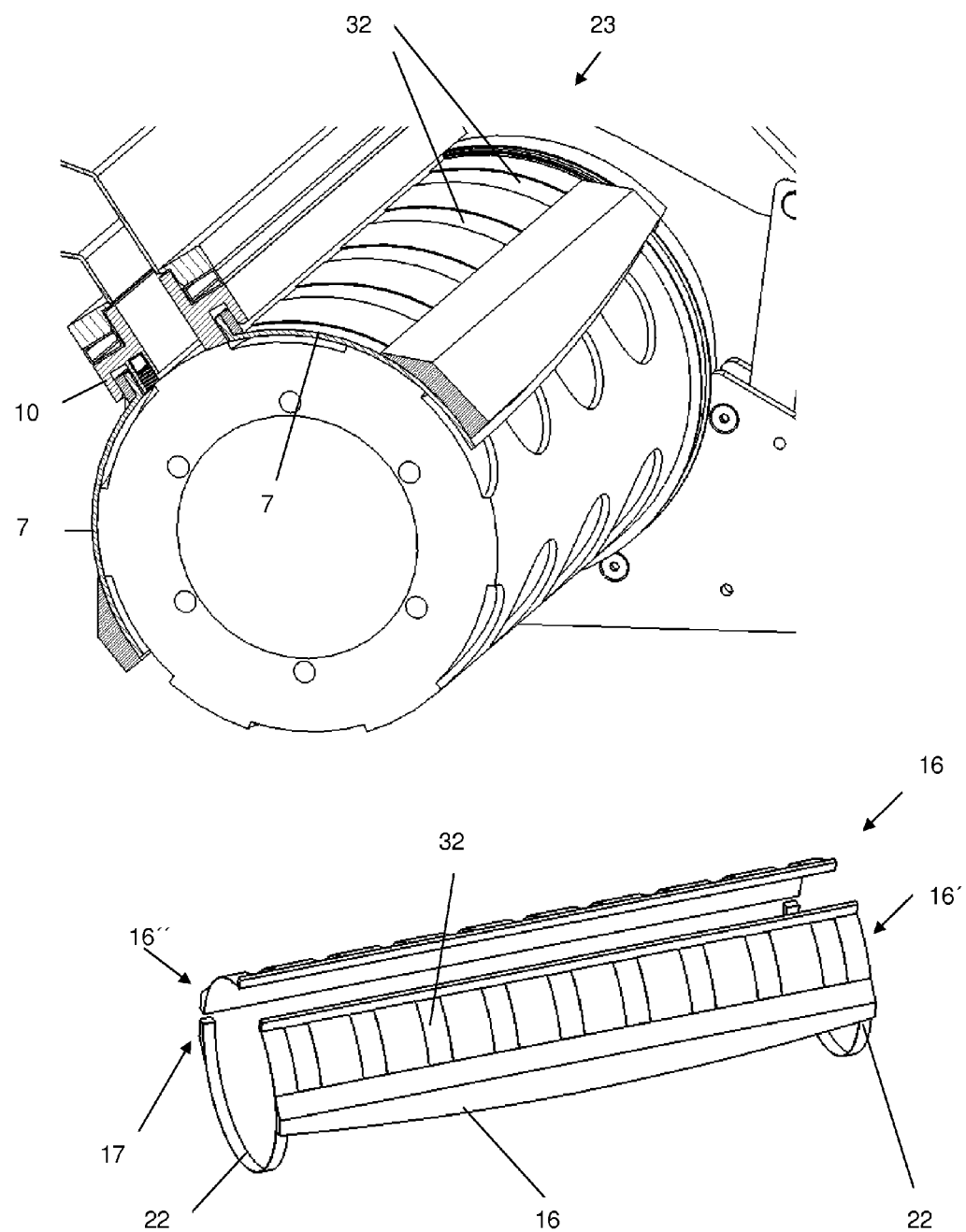
FIG. 9-11 shows an example how to tension a pressure plate 7 around a drum by a tension member and/or tension means 17.

FIG. 9 depicts another embodiment of the present invention. The food mass feed member 23 comprises a pressure plate 7, preferably a thin-walled preformed plastic plate, which is somewhat flexible to adapt to the outer surface of the drum and a tension members 16 and tension means 17, 22, as can be seen in the lower drawing of FIG. 9. The tension member 16 according to FIG. 9 comprises two flexible elements, an infeed element 16' and an outfeed element 16", which are both flexible and can thus adapt to the outer surface of the drum 5 and are each provided with at least one fasten means 32, here a multitude of straps 32 that is/are, in this embodiment of the invention, connected within a recess of the manifold 10. It is therefore necessary that the manifold 10 is rigid, for example made from stainless steel. After the drum 5 is positioned in the frame of the forming apparatus, the food mass feed member 23 will be placed in its position and fixedly connected to the frame of the forming apparatus. The pressure plate(s) 7 and the tension member 16 will be wrapped around the drum 5 with fastening means, here straps 22. These straps 22 are preferably preformed into a curved shape that corresponds to the circumference of the drum 5 in order to reduce forces. The straps 22, which are preferably provided with a wear resistant coating at the surface adjacent to the drum or which are made from a plastic material, will be tighten by tension means 17, for example a screw, which is provided between the straps 22 and the outfeed element 16". The fastening means are preferably also attached to the frame of the inventive apparatus. This tension presses the inner surface of the pressure plate 7 against the outer surface of the drum 5. The assembled tension member 16 and manifold 10 are preferably sufficiently rigid so that the tension member 16 and manifold 10 do not deform under normal operating conditions. Mainly tensile forces occur in the parts 22, 32. These parts 1, 22, 32 are ideally made from a material with no elastic elongation when it is subjected to tension. Spring-steel and composite materials are the preferred materials.

Figure 10:
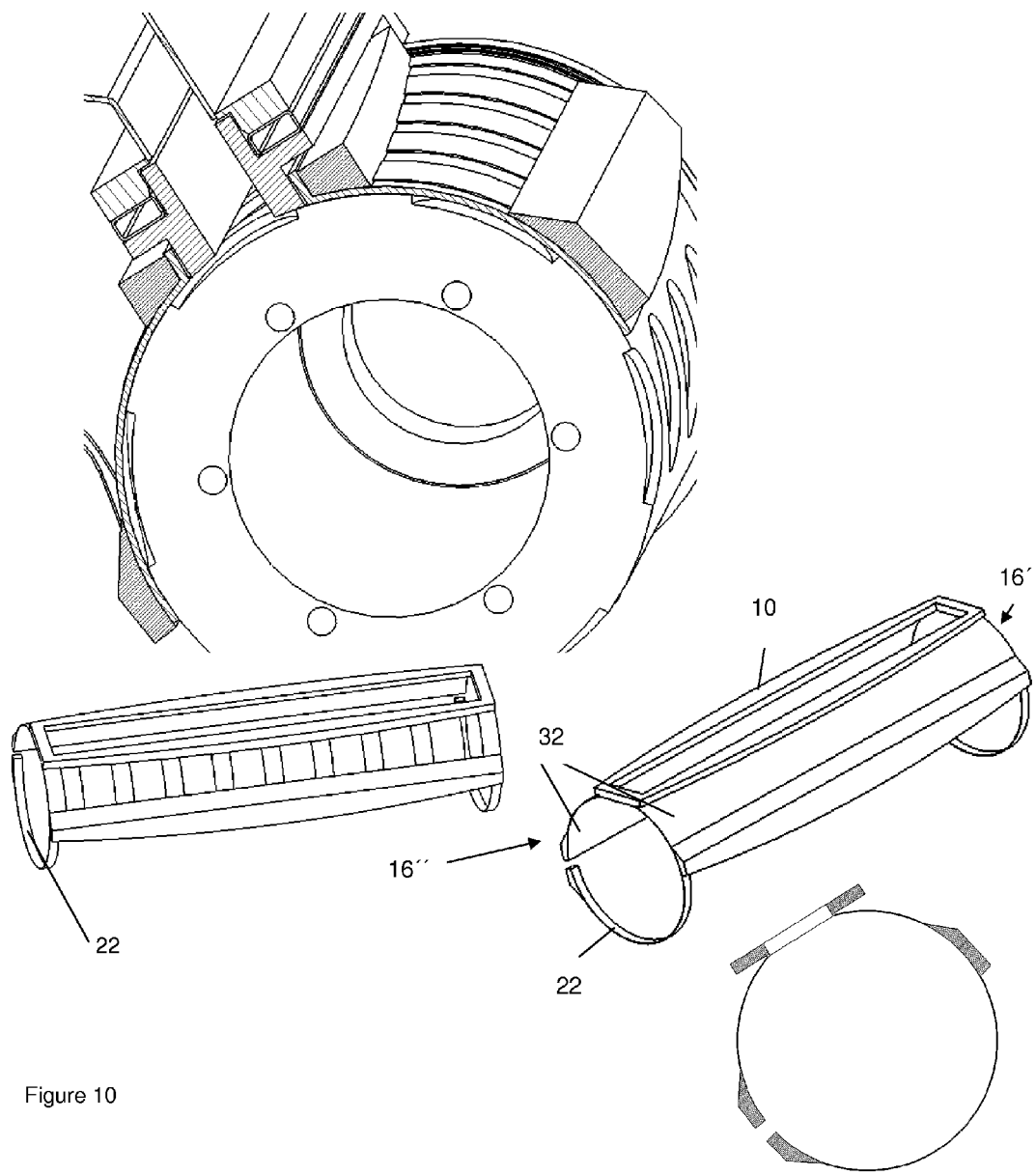

FIG. 10 shows two embodiments of the present invention in which the manifold 10, the tension member 16 and the strap 22 are provided as one assembly.

Figure 11:
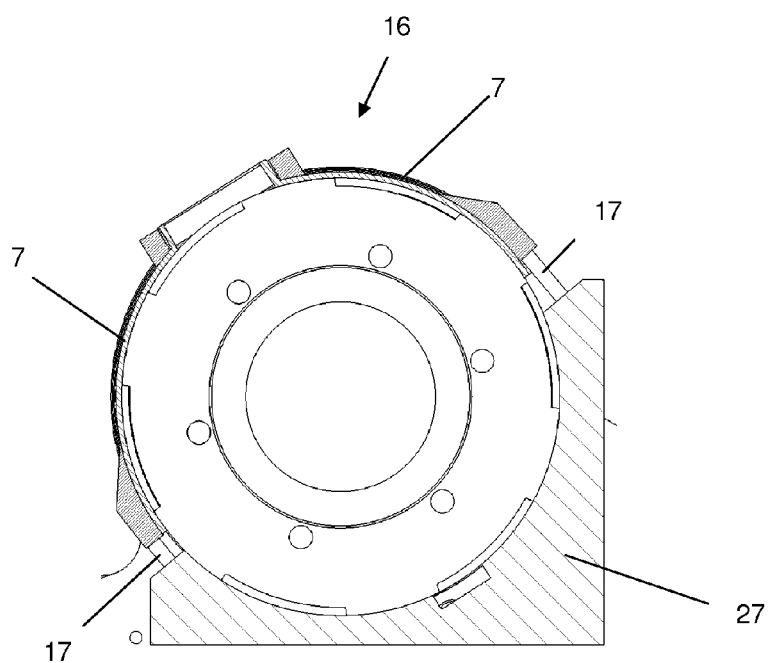

FIG. 11 shows a tension member 16 surrounding a pressure plate 7 and preferably provided with tension means 17, which are connected to a tension block 34. This tension block is preferably a rigid block, which is in contact with, preferably pressed against, the drum 5.

In general, the tension means 17 can consist of a mechanical system which is operated manually or it can for example be a mechanical/hydraulic system which can be operated automatically The process for adjusting the tension force can be done automatically for example by measuring the pressure between the outer surface of the drum and the inner surface of the pressure plate and/or by measuring the friction forces during rotation of the drum.

In the embodiments according to FIGS. 9-11, the pressure plate 7 cannot deform during the forming process and is, with relatively little pressure, in contact with the drum. Due to the low load of the pressure plate 7 on the drum there will be minimal wear of the pressure plate 7 and the drum surface. The load on the bearings of the drum 5 is reduced which will result in increased lifetime. The flexibility of the pressure plate 7 allows a small change of the diameter of the drum.

The drum is preferably made from stainless steel. Preferably, the drum is rigid in radial direction. If not, then the above mentioned embodiments can still lead to leakage of food product.

The manifold 10 is preferably made from wear resistant plastic to seal against the stainless steel outer surface of the drum. It is preferably provided with a pressure element 11 to assure a gap free contact with the surface of the drum. Preferably the pressure of this pressure element is automatically adjustable. In another embodiment the pressure can be generated via the same element (fluid-filled device 8 or a tension means 15, 17) which generates the pressure for the pressure plate. The manifold is preferably designed to wear a few millimeters and then still remains usable. The pressure of the pressure element against the drum can be controlled, for example, based on the feed pressure of the feed means, e.g. the higher the feed pressure, the higher the pressure of the pressure plate against the drum is selected.

Figure 12:
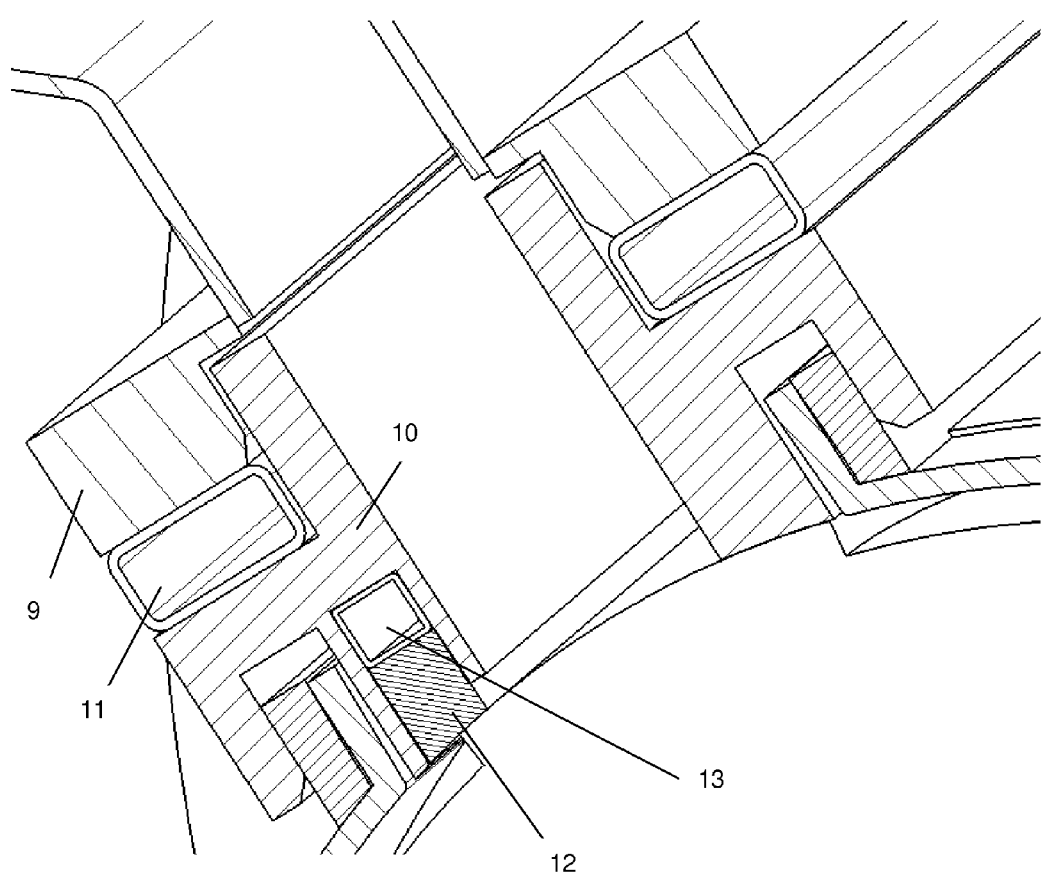
FIG. 12 shows cutting elements.

All embodiments can be provided with a cutting member 12, see FIG. 12. The cutting member is preferably provided in a recess in the manifold 10 and will be used to assure a clean cut of food material during rotation of the drum and is preferably made of wear resistant plastic to seal against the stainless steel surface of the drum. To improve cutting action it has to be provided with a sharp edge or a suitable toothed profile.

The cutting member is provided with a pressure element 13 to assure a gap free contact between the cutting member and the drum surface. Preferably this is a separate pressure element which is preferably automatically adjustable. In another embodiment the pressure can be generated via the same element (fluid-filled device 8 or a tension member 15, 17) which generates the pressure for the pressure plate. The pressure of the pressure element 13 can be controlled, for example, based on the feed pressure of the feed means, e.g. the higher the feed pressure, the higher the pressure of the pressure element is selected.

Figure 13:
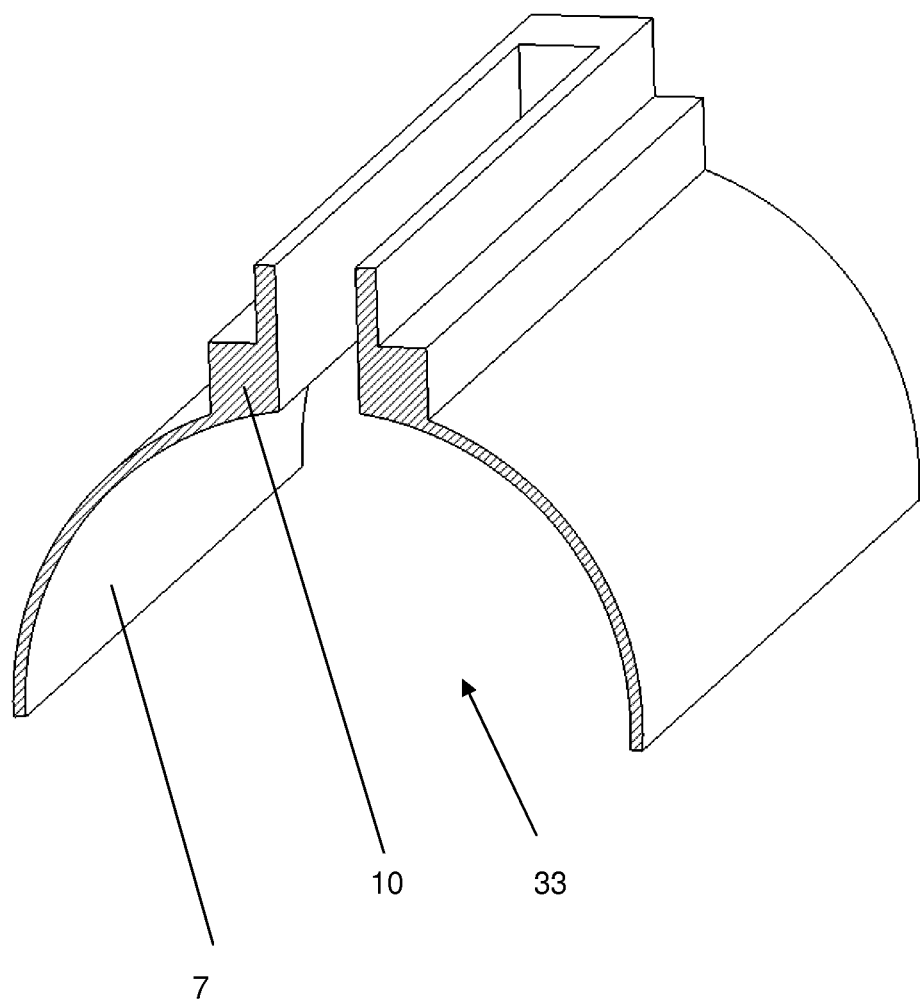
FIGS. 13-15 show preferred embodiments of an assembly, manifold/pressure plate.

In the embodiment according to FIG. 13, the pressure plate 7 and manifold 10 are integrated in one assembly 33 or one single part 33. This gives an improved sanitary design because there are no cracks or small grooves in the food area where meat and/or meat particles can accumulate. An additional advantage is that the pressure plate is attached to the manifold and deformation of the pressure plate in the vicinity of the manifold 10 due to the frictional forces from the drum during operation will be prevented. This embodiment may comprise a pressure element 11. This pressure element 11 presses the manifold part 10 and also the pressure plate part 7 of the assembly 33 against the drum. The manifold part 10 can be provided with a cutting member and a cutting member pressure element, as described in FIG. 12.

In general, the housing can be produced by molding, preferably, by rotational molding. This preferred embodiment has, for example, the advantage that no milling or the like and no material losses are needed.

Figure 14:
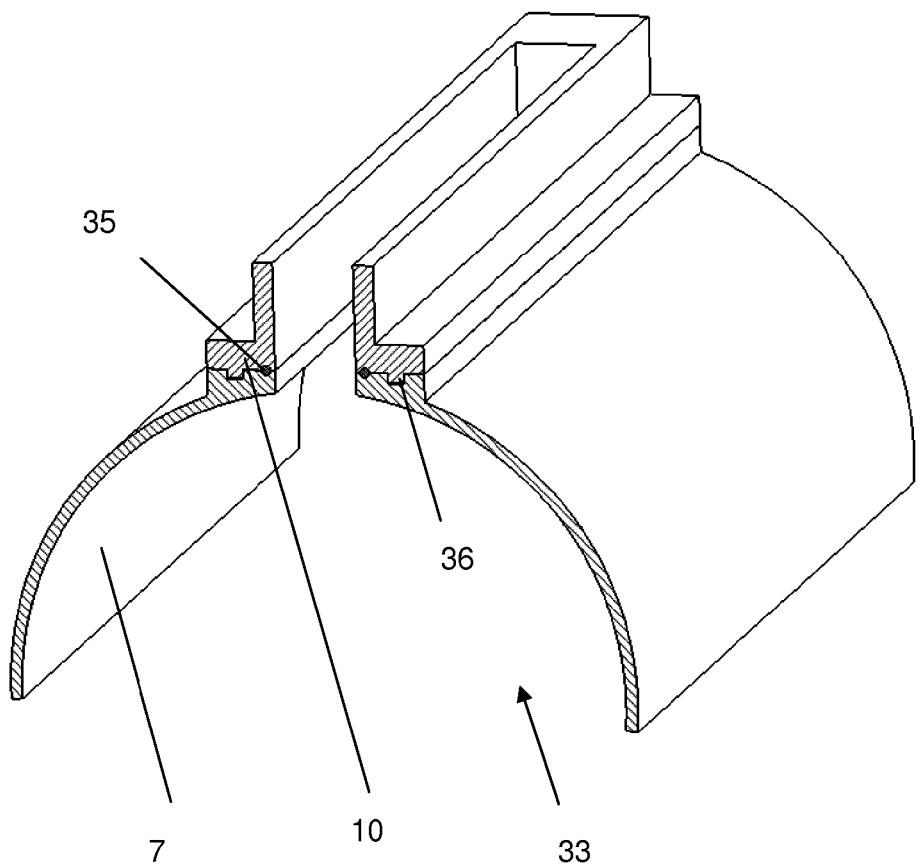

Referring to FIG. 14, the pressure plate 7 and manifold 10 are separate parts.

The manifold 10 is sealingly connected to pressure plate 7, for example by an O-ring 35. Form-fit-means 36 between the manifold 10 and the pressure plate 7 improves their connection, so that deformation of the pressure plate in the vicinity of the manifold 10 due to the frictional forces from the drum during operation will be prevented. This embodiment may comprise a pressure element 11. This pressure element 11 presses the manifold part 10 and also the pressure plate part 7 of the assembly 33 against the drum. The manifold part 10 can be provided with a cutting member and a cutting member pressure element, as described in FIG. 12.

Figure 15:
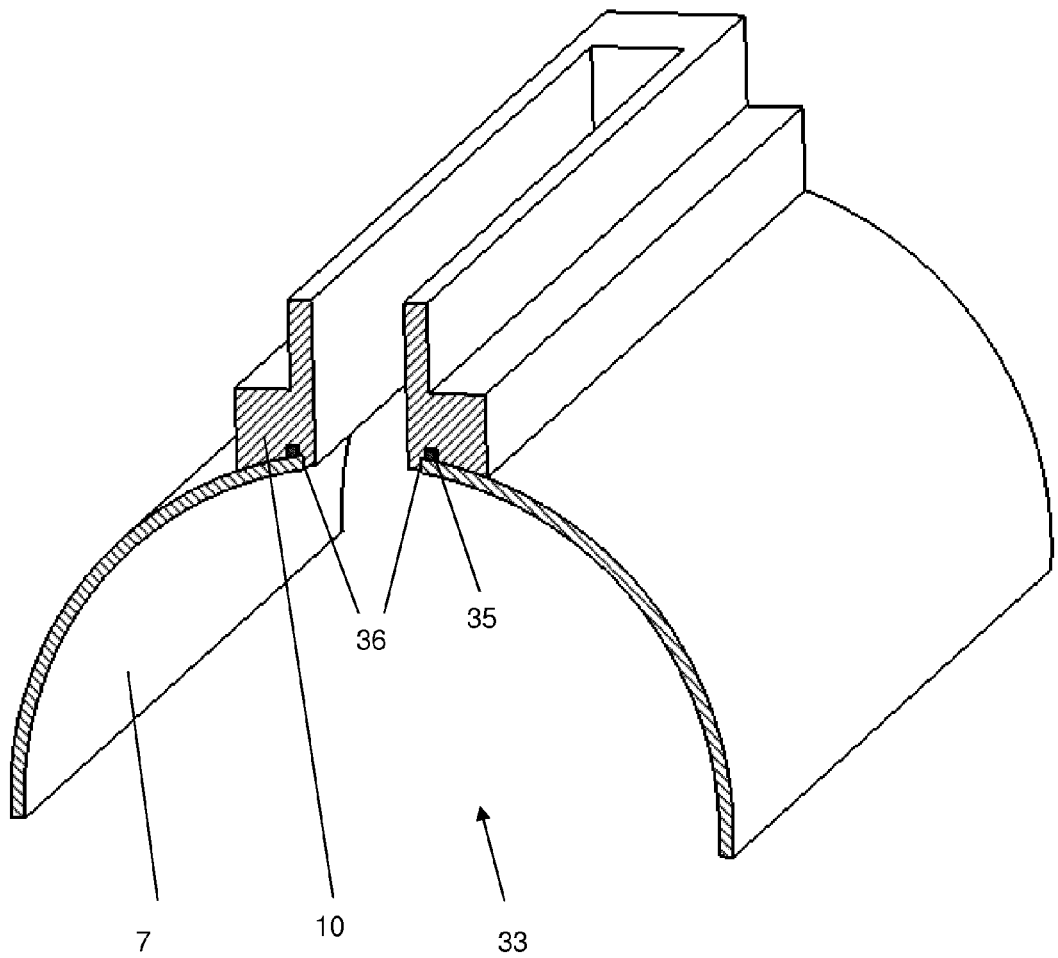

Referring to FIG. 15, the pressure plate 7 and manifold 10 are separate parts.

The manifold 10 is sealingly connected to pressure plate 7, for example by an O-ring 35. Form-fit-means 36 between the manifold 10 and the pressure plate 7 improves their connection, so that deformation of the pressure plate in the vicinity of the manifold 10 due to the frictional forces from the drum during operation will be prevented. This embodiment may comprise a pressure element 11. This pressure element 11 presses the manifold part 10 and also the pressure plate part 7 of the assembly 33 against the drum. The manifold part 10 can be provided with a cutting member and a cutting member pressure element, as described in FIG. 12.

FIG. 16 shows another embodiment of the inventive apparatus, for example of the apparatus according to FIG. 1. Both, the flexible plate 7 and manifold 10 are in, the present example one single part. The person skilled in the art understands, however, that the flexible plate 7 and the manifold 10 can be also separate parts. The main difference in comparison to the embodiment according to FIG. 1 is the infeed channel 24. In FIG. 1 the food mass flows through the infeed channel which has approximately the same width as the maximum distance between the product cavities in longitudinal direction of the drum 5.

In the embodiment according to this figure, however, a pump- or a connection-unit 39 has a smaller width, for example 400 mm. The pump- and/or connection unit 39 is connected via the housing 9 to manifold 10. In this manifold further distribution of food mass to a width of for example 1000 mm will take place. The manifold itself is preferably designed such, that it extends from its inlet to its outlet from the size of unit 39 to the maximum axial length of the cavities.

FIGS. 17a and b show another embodiment of food mass feed member 23.

The food mass feed member 23 comprises a housing 9 and a flexible plate 7.

The housing 9 comprises here a manifold 10, an infeed channel 24, a filler 38, a fastening means 32 and/or preferably a recess 37, more preferably, a deformation recess 37. The integration of the several parts provides an improved sanitary design. The flexible plate 7 can be secured to housing 9 by for example a by click system or another mechanical locking system to prevent that the flexible plate will be displaced due to the frictional forces during operation or meat will accumulate between the flexible plate and the housing. Infeed channel 24 is designed to direct the flow of mass in the direction of the drum.

A filler 38 is provided in the manifold part of housing 9. This filler is made of a material that is flexible, but stiff enough to withstand the forces during production. Preferably this is a lightweight and food approved material like PUR or PE. In case, the weight of the formed food product is too high, this weight can be corrected by reducing the diameter of the drum. Consequently, the flexible pressure plate 7 must be pressed against the drum with a smaller radius than initially. This is, at least partially achieved with the filler 38. The housing and/or the filler 38 can be provided with one or more deformation recesses 37 in circumferential direction of the drum. These recesses 37 are each designed in radial direction in the manifold. The width of each recess must be limited, particularly in the vicinity of the flexible pressure plate 7, to provide sufficient pressure on the flexible pressure plate 7 and/or that the flexible pressure plate 7 will not deform during production. For cleaning purposes and/or for inspection purposes, the width of each recess 37 must be large enough so that the recess 37 is accessible and can be cleaned, for example by means of a high pressure washer. In a preferred embodiment, as shown in FIG. 17*c*, the cross-section of the recess 37 is formed as a keyhole. This embodiment has, for example, the advantage that the contact area between the housing and the pressure plate is increased, without a loss of flexibility of the housing.

Because of its complex structure, the housing 9 is preferably made with rotational molding. With this technique, a sanitary, single piece, for example consisting of manifold 10, infeed channel 24, filler 38 and/or deformation recesses 37, can be created. With rotational molding it is also possible to implement stainless steel inserts, for example in the region of the manifold 10, to reinforce the construction.

Preferably, fastening means 32 are provided. These fasting means 32 can be connected to a sub frame or a frame of the inventive machine to secure the position of housing 9 and thus the flexible plate 7 against the drum as already described above.

Another option is to extend the fastening means 32 for example with straps 22. By means of tension means (not depicted) the straps can be connected to each other. Fastening means and/or straps can be made, for example, from composite material like carbon fiber or from stainless spring steel.

In the present case, the inlet of the food mass has a circular cross section. From here the mass will be divided over the width of the machine, i.e. the axial length of the drum. To improve the distribution of meat over the width of the machine, the inlet of the food mass can have, for example, a rectangular cross-section too. In case of the length of the drum of 1000 mm, the width of the cross section of the inlet of the food mass is preferably 400 mm.

FIG. 18 shows another embodiment of the present invention, for example another embodiment of the machine according to FIG. 17. In the present case, inlet of the food mass is via one or both front edge(s) 40 of the food mass feed member 23. Preferably, the inlet is parallel to the axis of rotation the drum. This inlet is preferably connected to a manifold (not depicted), that distributes the food mass to the individual cavities.

FIG. 19*a* shows essentially a modification of the embodiment of FIG. 16. In FIG. 19*a* cutting member 12 can be integrated in the manifold 10 as one part but preferably the cutting member is a separate part which will be positioned in manifold 10 and secured by connection means (not shown). The cutting member 12 is preferably much thinner than in the embodiments shown above and is preferably made of an metal alloy which is hard and durable enough to be in touch with a stainless steel drum 5 without damaging the surface of the drum. The cutting member has a sharp edge or a suitable toothed profile. According to the embodiment shown FIG. 19*b*, the cutting member 12 is provided with pressure means 13 to assure that the cutting member is always in contact with the surface of the drum and/or pressed against the drum. Otherwise reference is made to the embodiment according to FIG. 19*a*.

Food mass feed member 23 depicted in FIG. 20 comprises of housing 9 and flexible plate 7. The housing 9 is, for example, similarly designed as the housing according to FIGS. 17*a* and 17*b*. In the embodiment according to FIG. 20, however, reinforcement means 31 is integrated into the housing to increase its stiffness an thus, for example, to reduce the forces on fastening means 32 and/or an eventually used strap member 22, as depicted, for example, in FIG. 9 of the present patent application.

In FIG. 21, the food mass feed member 23 is designed and produced as one part which consist of the manifold 10, the infeed channel 24, the deformation recess 37, preferably the filler 38 and also the flexible plate 7. The fastening means 32 can also be integrated in the food mass feed member as a one part solution.

The infeed channel 24 is, in the present case provided with a food mass infeed via one or both front edge(s) but can, alternatively or additionally, be provided with a food mass infeed perpendicular to axial direction of the drum, as, for example shown in FIG. 20.

The deformation recesses 37 in the housing are, in this example, open to the outer circumference of housing 9. Fastening means 32 are provided. However, a strap member 22 can be utilized additionally or alternatively.

FIG. 22 shows an embodiment of a housing 9 in which different fillers 38 will be used. In the present example at least one internal volume of the housing 9 will be filled with a solid filler (38 solid), for example a foam, while at least another volume (38 fluid) is subjected to a fluid, for example air and/or an incompressible fluid like water. Different recesses can be filled with different fluid fillers. Preferably only the inner volume of the housing 9 close to the infeed channel 24 and/or the inner volume of the housing 9 at the outer ends are filled with a solid filler material. The pressure of the fluid filler in the other recesses is preferably adjusted to assure sufficient pressure on the pressure plate. The housing 9 is preferably secured by fastening means 32 and/or a strap member 22 (both not shown).

In general, all plastic parts, for example the flexible plate, the manifold, the filler material, etc that will be used in the inventive apparatus, are preferably provided with food approved anti-biological additives. These additives prevent that microorganisms will contaminate the food product, grow and reproduce. By chemically or physically binding these additives into the plastic product, the additives remain in the plastic and cannot be washed off or wear during production and/or cleaning.

FIG. 23 shows another embodiment with one or multitude of spring element(s) used to apply a force on the pressure plate. Each spring element 44 can for example be an O-ring with a round cross section but a spring element with another cross sections is possible too. Around the infeed channel a combined seal and spring element 43 is preferred to press the pressure plate 7 against the outer surface of the drum and to prevent leakage of mass between housing 9 and pressure plate 7. Upstream and/or downstream a spring element 44 will be used.

Assuming a given position of the housing 9 relative to the drum, the force of the spring element(s) can be changed by changing the material and/or hardness of the spring elements. The force on the outer surface of the drum will be for example higher with spring elements of 90 Shore than with spring elements of 70 Shore. Further the force can be changed by changing the number of pressure elements 44, the thickness and material of pressure plate 7 and by the dimensions of the recesses in pressure plate 7. When the spring elements that will be used have only a limited deformation possibility, adjustment of the forces can be increased by changing the position of housing 9 with respect to the drum. The position can even be a controlled movement depending on the pressure of the mass in the infeed channel.

FIG. 24 shows an embodiment with round inflatable elements 45 and 46 based on the use of fluid. The inflatable element is here a hollow cord with here a round cross section and is inflatable with a pressurized fluid, for example air or water. Other cross-sections of the inflatable element are possible too. Element 45 has additionally a sealing function.

The pressure of the fluid in each inflatable element is preferably proportional to the pressure of the mass in the infeed channel. The pressure in each inflatable element is preferably adjustable, more preferably individually adjustable, which is for example advantageous in a start-up situation but also during production. During start-up, a low pressure in the inflatable elements is desired so that less motor torque is necessary to overcome the static friction. During production the pressure between the pressure plate and drum can be adjusted as low as possible to prevent wear of both the pressure plate 7 and drum surface. Wear of one or both surface(s) results in grooves and leakage.

The fluid for each inflatable element will be, for example, provided via the main fluid supply 47 which is connected to fluid connections 29. Via the manifold, every inflatable element is provided with fluid, preferably each at an individual pressure. The fluid can be air, water, etc. The more the pressure elements are pressurized, the higher the force of the pressure plate 7 on the drum surface.

The person skilled in the art understand, that less inflatable elements and thus less fluid connections can be utilized by extending the length of each inflatable element.

Figure 25:
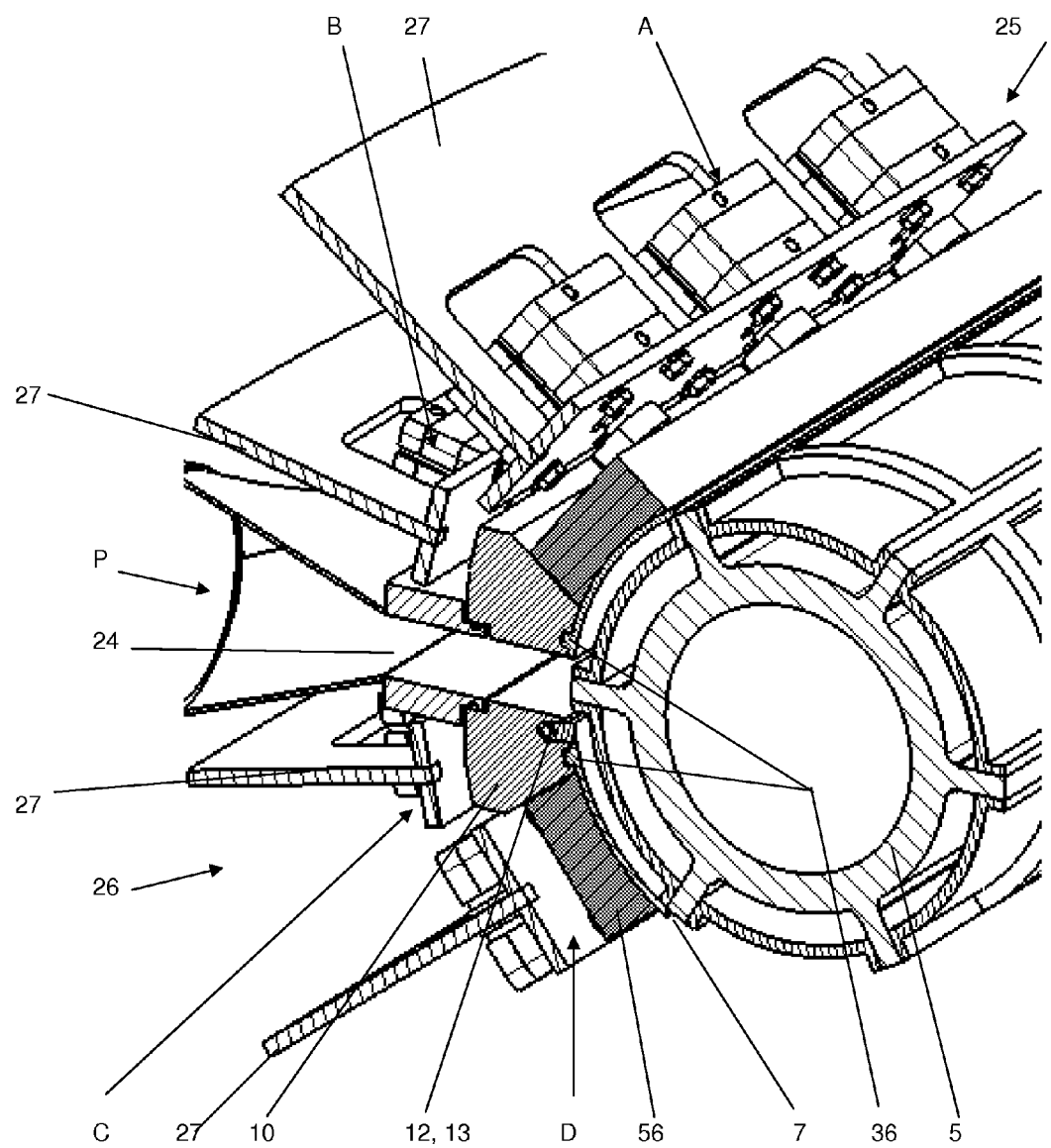

FIG. 25 shows a cross section of an embodiment with a manifold 10 and/or a stabilization block 56 used to force the pressure plate 7 against the circumference of drum 5. In the present embodiment, as can be particularly seen from FIG. 28, the manifold 10 and the stabilization block are both pressed against the pressure plate 7 and/or against the drum directly via pressure means 50-55, for example cylinder/piston-arrangements, which are arranged in rows, which extend parallel to the longitudinal extension of the drum. The pressure means can be fixed, for example to the frame of the apparatus and may be controlled individually and/or in groups. This allows varying the pressure-distribution of the manifold, the stabilization block and/or the pressure plate along the longitudinal extension of the manifold 20 and/or the pressure plate 7 or to have essentially the same pressure along each row. The pressure means can also be utilized to adjust the position of the manifold 20, the stabilization block 56 and/or pressure plate 7 relative to the drum. In the present example, the pressure means arranged in rows B and C press the manifold 10 against the drum, while stabilization blocks 56 are pressed against the pressure plate via pressure means in rows A and D. The pressure means in row A and B are part of the upstream sealing area 25 and pressure means in rows C and D are part of the downstream sealing area 26. Preferably a cutting member 12 and pressure means for cutting member 13 are provided, which are more preferably both integrated in the manifold. The stabilization blocks 56 are utilized to stabilize the pressure plate in its form and/or to equalize the pressure provided by the pressure means 50-55. The person skilled in the art understands that the stabilization blocks can be omitted or integrated into the pressure plate. In this case, the pressure means 50-55 and/or the pressure means in rows A and D will be in direct contact with the pressure plate. To separate the stabilization block/element from the pressure plate has the advantage, that the pressure plate, as a warepart can be exchanged more easily and less costly.

As described already described according to FIG. 1, the pressure means in the rows A-D can be bags which are filled with preferably an uncompressible fluid for example water or oil. When using this system the housing around the fluid-filled bags is preferably extremely stiff. In another embodiment the pressure means can be long inflatable elements, for example bellows in circumferential or longitudinal direction of the drum and the used fluid will be compressible such as air. In the preferred embodiment according to FIG. 25 the pressure means is one or more pressure element(s) for example a cylinder/piston-arrangement, particularly a cylinder/piston arrangement operated with air as the driving fluid. More preferably, the cylinder/pistons of one row are all build in one block, preferably a sanitary block. The fluid used to operate the cylinders is preferably compressible such as air or another compressible gas. The pressure of the fluid will preferably be proportional to the pressure of the mass in the infeed channel 24. The position and/or the pressure of each pressure element can be, preferably controlled individually or in groups or in an entire row.

The pressure plate 7 is preferably connected to the manifold 10 and/or to the stabilization block 56. This can be utilized, for example, by form-fit-means 36 here ribs on the pressure plate and recesses in manifold 10 (or vice versa). These form-fit-means create a fixed position of pressure plate 7 and can eventually also be provided in stabilization blocks 56.

Figure 26:
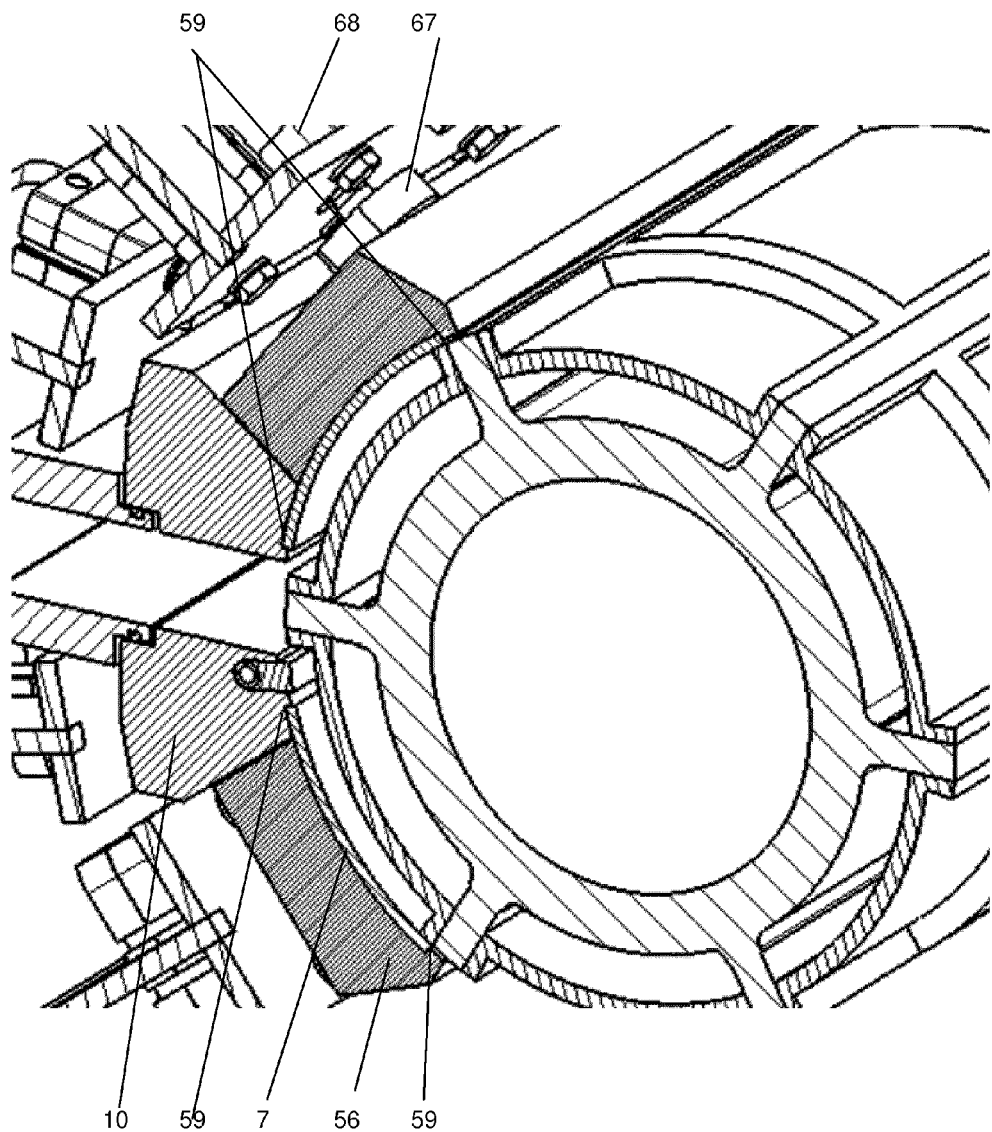

FIG. 26 shows a similar embodiment as FIG. 25 only the design of the pressure plate is changed. In this design no form-fit-means are used, but the pressure plate is fixed by a recess 59 inside the manifold 10 and/or the stabilization block 56. The dimension of the outer circumference of the pressure plate is slightly smaller than the dimension of the recess in the manifold and stabilization block, so that the pressure plate is pressed into the recess. This solution is particularly advantageous in case the pressure plate is a flat plate which can be shaped into the depicted curved form, for example, in a vacuum oven. However, depending on the thickness and/or the chosen material, even a forming at ambient temperature can be sufficient, which is a preferred embodiment.

In the embodiment shown in FIGS. 25 and 26, pressure means in rows A and D are pressing against the stabilization blocks and pressure means in row B and C are pressing against the manifold, respectively. Both, the stabilization blocks and the manifold press the pressure plate against the outer surface of the drum. The manifold is relatively stiff in longitudinal direction of the drum.

Figure 27:
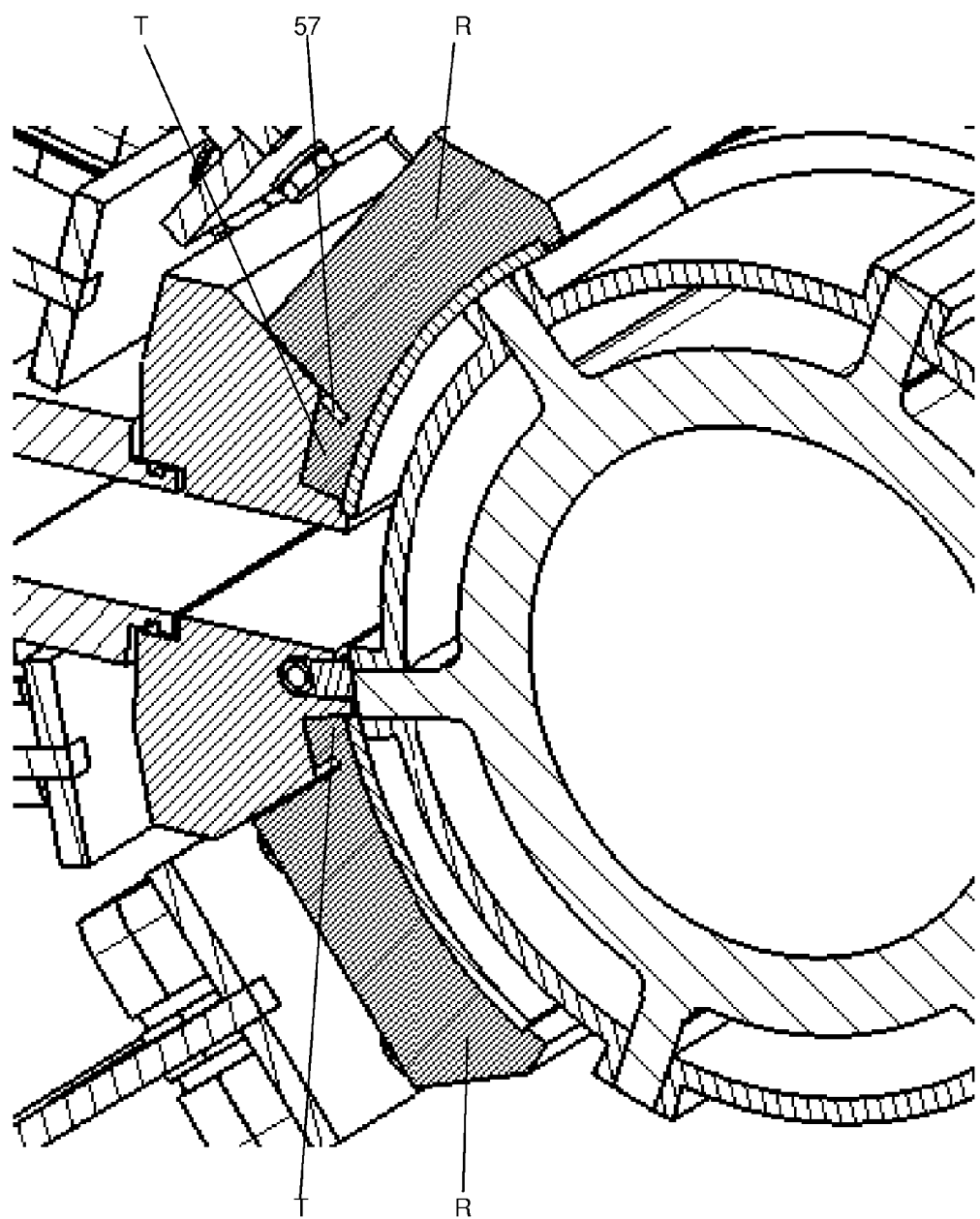

In the embodiment according to FIG. 27, the manifold 10 is fixedly connected to a support frame (not shown) and this support frame preferably can be moved away from the drum (for cleaning purposes) or can be moved to the drum (during production). During production the support frame has a fixed position with respect to the drum, preferably the axis of the drum. In the present case, the stabilization block comprises two zones R, T, Each extending over the entire length of the drum, as one or multiple pieces. The two zones R, T are coupled together by a zone 57, preferably of increased flexibility. In the present case, zone 57 comprises a notch, which works as a hinge. Pressure means in row A and D are pressing part R of the stabilization blocks and pressure means in row B and C are pressing part T of the stabilization blocks against the pressure plate. The stabilisation blocks are shown as one block. However, every row of pressure means can press against a separate stabilization block, whereas each stabilization block 56 preferably extends over the entire length of the drum. The embodiment according to FIG. 27 will improve the sealing of the part of the pressure plate which is close to the infeed channel in case the drum will deform due under its load. In the present case, The flexibility of each stabilization block can be increased by notch(es) 57.

As can be clearly seen, particularly from FIGS. 25-27 the food mass feed member preferably does not comprise any holding means, i.e. means, that maintain an increased pressure in the product cavities after they have been filled. Immediately after or even during filling, the exposure of the product cavities 6 to ambient pressure starts. This embodiment of the present invention has the advantage that the pressure plate, particular in the down-stream circumferential direction can be designed rather short, which reduces wear and/or smearing of the product.

Reference is now made to all exemplary embodiments of the present invention. According to a preferred embodiment the drum comprises, at least partially porous, for example sintered, product cavities 6. More preferably, each cavity 6 is connected to a fluid passage which is, for example, connected to the ambient. Preferably, all cavities in one row are connected to one fluid passage. Via the porous cavities and the fluid passage, the cavities can be vented during filling, so that the formed food products are free of air pockets.

Figure 28:
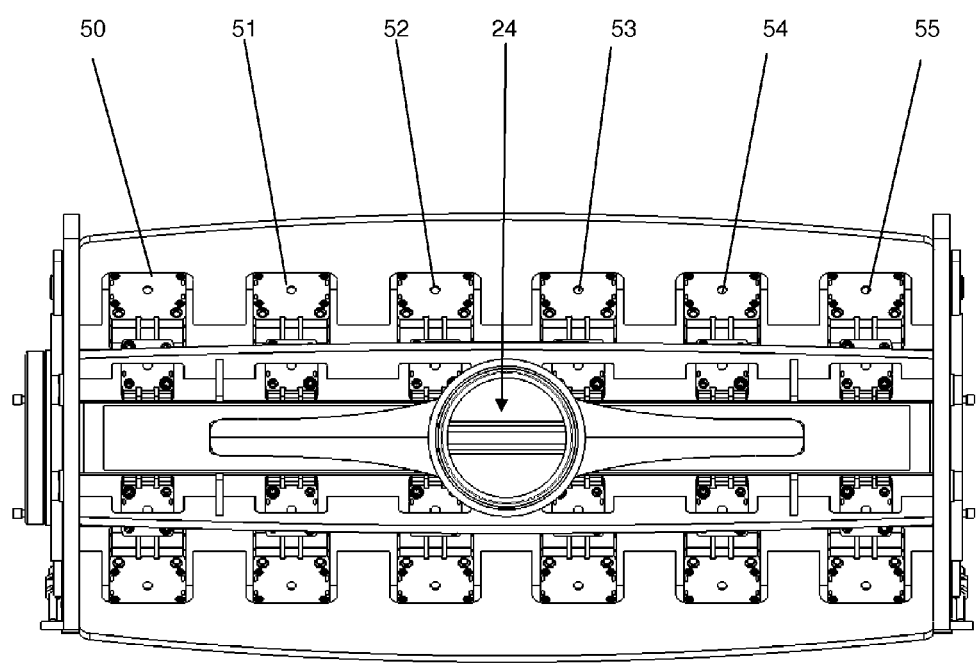

FIG. 28 depicts view P according to FIG. 25. However, reference is also made to FIGS. 26 and 27. In the longitudinal direction of the drum several pressure elements 50-55 are provided. The number of pressure elements depends mainly on the length of drum 5. A control unit is preferably used to control the pressure and/or position of each pressure element, for example the position of every piston and/or cylinder of each pressure element, separately and/or as a group of several pressure elements. In the present case, the pressure element is a cylinder/piston arrangement operated with air.

The drum in FIGS. 25-27 has its maximum deformation (deflection) in the middle of its longitudinal extension. In order to maintain the contact between the drum and the pressure plate, even during this deflection its, the piston of the pressure in cylinders 52 and 53 will more extended than the piston of the cylinders 51 and 54 and the position of the pistons of the cylinders 50 and 55 will be even less extended than the pistons of the cylinders 51 and 54. Preferably, the pressure at which the pressure of the pressure plate is pressed against the drum is everywhere the same. Preferably this pressure is related to the fill pressure and is preferably higher, more preferably slightly higher than the fill pressure to prevent extreme wear of both the pressure plate and the drum. Preferably, all cylinders 61-66 are connected to the same pressure source and are exposed to the same pressure.

The use of a piston/cylinder operated with air has the advantage that this pressure element is rather flexible and not so stiff. Thus, lacks of the circularity of the drum and/or its concentric run out can be overcome.

Figure 29:
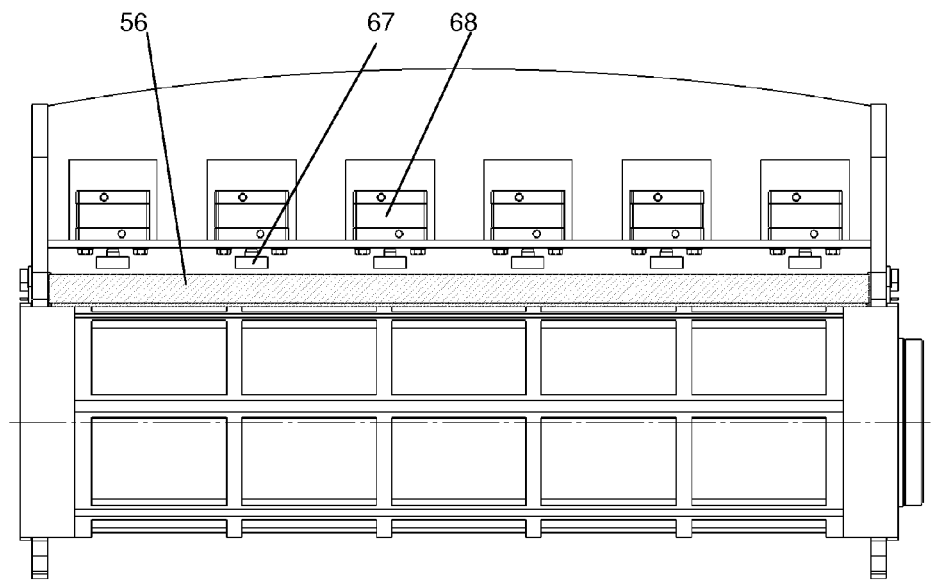

FIG. 29 shows a relatively stiff stabilization block 56. Stabilization blocks 56 are preferably used to prevent that the pressure plate 7, made for example from a thin plastic material, will be deformed into the product cavities 6 of the drum. The combination stabilization block/pressure plate is stiff in longitudinal—as well as the circumferential direction of the drum. This gives a sufficient sealing in a situation that the drum will not deform by the load during production. All pressure means will have the same pressure.

Figure 30:
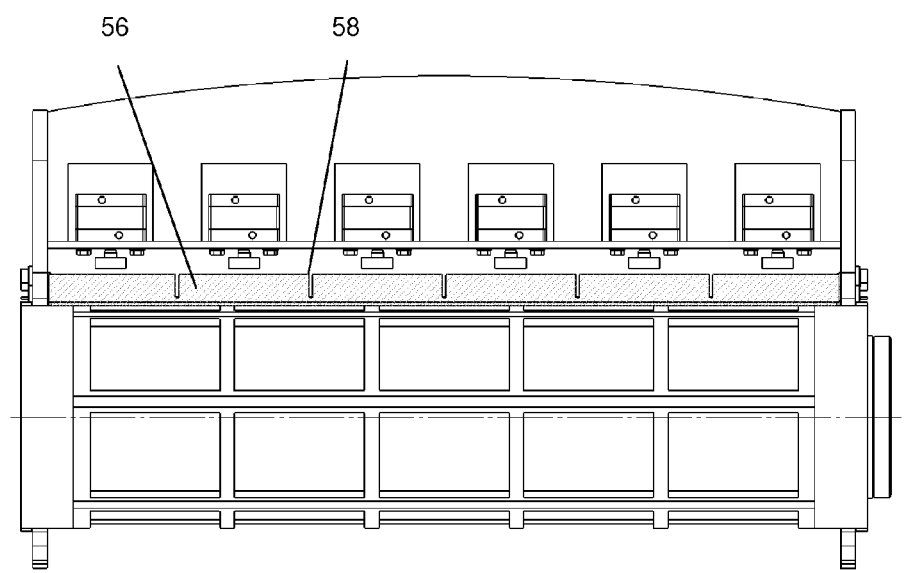

In case, the drum deforms under its own load and/or the load of the filling pressure it is preferable that each stabilization block is more flexible in longitudinal direction of the drum with the result that the shape of the stabilization block will follow the deformation of the drum. This can be done by decreasing the thickness of the stabilization blocks. It can also be done by providing the stabilization blocks with one or more hinge-like elements 58, for example notches as depicted in FIG. 30.

The number of rows with pressure means and the number of stabilization blocks that will be used in the embodiments according to FIGS. 25-27 depends mainly on the length of the pressure plate in circumferential direction. The pressure in the upstream sealing area 25 and the downstream sealing area 26 can be adjusted differently to reduce wear of the pressure plate and/or the drum.

In FIG. 31 a preferred embodiment to decrease the stiffness of the pressure plate is depicted. In the present case, a hinge-like region 60, for example a notch or the like is provided in circumferential- and/or longitudinal-direction (not depicted). In the present case, a multitude of regions 60 are provided at one or more positions in longitudinal direction, preferably equidistantly. Preferably these region(s) are positioned between two circumferential rows of product cavities. However, a non-equidistant distribution of the regions 60 is also preferred.

FIG. 32 shows an embodiment of a cutting member 12 and pressure means 13 which are designed as an inflatable element. The pressure which will act on the cutting member should be sufficient for the cutting action. The cutting member is preferably flexible, that due to the pressure means 13, its shape in longitudinal direction follows the shape of the drum. The cutting member 12 is shown as a relatively thick member and is preferably made from plastic to prevent that the stainless steel drum will be damaged. To prevent that the cutting member will be damaged by the high cutting forces, it can be reinforced by metal or reinforced plastic can be used. Further a plastic material can be chosen in which small metal particles are added. When during production pieces of the plastic cutting member break and will be part of the formed food products these plastic pieces can easily be found by checking the formed products with a metal scanner. Due to food safety all used materials have to be FDA approved.

In case of high load on the drum in combination with a drum with low stiffness the cutting member will not follow the deformation of the drum anymore. For this reason the cutting member can also be provided with one or more notches (not shown) to decrease the stiffness in longitudinal direction.

FIG. 33 shows cutting member 12 and pressure means designed as fluid cylinders 61-66. During production every pressure element, particularly its extension, can be adjust separately to account for the deformation of the drum.

Preferably, the pressure of the fluid cylinders 61-66 is identical. Preferably, all cylinders 61-66 are connected to the same pressure source.

LIST OF REFERENCE SIGNS

1 Food product forming apparatus
2 Upstream compartment
3 Filling-area compartment
4 Downstream compartment
5 Drum
6 Product cavity
7 Pressure plate
8 Fluid-filled device, bag
9 Housing
10 Manifold
11 Pressure means for the manifold 10
12 Cutting member
13 Pressure means cutting member
14 Joint
15 fastening means, means to alter the position of the housing 9 relative to the drum 5
16 Tension member
16' infeed element
16" outfeed element
17 Tension means
18 pressure plate assembly
19 Channel part assembly
20 Housing part assembly
21 Part of the fluid filled device 8, upper part, lower part
22 Strap
23 food mass feed member
24 infeed channel, food mass infeed channel
25 upstream sealing area
26 downstream sealing area
27 frame
28 bearing, hinge
29 fluid-connection
30 opening for food mass infeed, opening for the manifold 10
31 reinforcement means, rib, straps
32 fastening means
33 channel part assembly
34 tension block
35 sealing means, O-ring
36 form-fit-means
37 recess deformation recess
38 filler
38 solid filler
38 fluid non solid filler, water, gas, gel
39 inlet connection
40 front edge
41 inlet of the food mass feed member 23
42 element to increase the flexibility of the fluid filled device
43 Combined seal and spring element
44 Spring element
45 Combined seal and inflatable element
46 Inflatable element
47 Main fluid supply
50-55 Pressure element manifold/stabilization blocks
56 Stabilization element, stabilization block
57 Notch stabilization block 56 in circumferential direction
58 Connecting element, hinge-like element, notch stabilization block 56 in longitudinal direction
59 Recess
60 hinge-like element, notch for the pressure plate 7
61-66 Pressure element cutting member
67 piston
68 cylinder
W width of the infeed channel

The invention claimed is:

1. A food-forming-apparatus comprising:
a rotating drum comprising product cavities in which a food product is formed from a food mass; and
a food mass feed member comprising:
 i. a housing and/or a frame with an infeed channel comprising a manifold,
 ii. at least one upstream sealing area and/or a downstream sealing area, and
 iii. a flexible pressure plate pressed against an outer surface of the drum such that the product cavities are exposed to ambient pressure after filling of the product cavities with the food mass,
wherein as soon as the infeed channel is no longer in communication with a respective product cavity, at least a leading edge of the respective product cavity is no longer in communication with the pressure plate so that the respective product cavity is exposed to ambient pressure.

2. The food-forming-apparatus according to claim 1, wherein the food-forming-apparatus comprises a pressure means to adjust:
 i. a local position of the manifold and/or a stabilization element and/or the pressure-plate, and/or
 ii. a local pressure of the manifold and/or the stabilization element and/or the pressure-plate.

3. The food-forming-apparatus according to claim 1, wherein the food-forming-apparatus comprises a cutting member which is pressed against the drum by a pressure means to adjust a local position and/or a local pressure of the cutting member.

4. The food-forming-apparatus according to claim 1, wherein the pressure-plate comprises a hinge-like element so that the pressure-plate is adaptable to a shape of the drum and/or to changes of the shape of the drum during operation of the-food forming-apparatus.

5. The food-forming-apparatus according to claim 1, wherein the food-forming-apparatus comprises a stabilization block and/or a cutting member and the stabilization block and/or the cutting member comprise a hinge-like element so that the stabilization block and/or the cutting member are adaptable to a shape of the drum and/or to changes of the shape of the drum during operation of the food-forming-apparatus.

6. The food-forming-apparatus according to claim 4, wherein the hinge-like element extends in a circumferential and/or in a longitudinal direction of the drum.

7. The food-forming-apparatus according to claim 1, wherein the food mass feed member comprises an adjustable fluid-filled device to increase and/or decrease pressure between the pressure-plate and the outer surface of the drum, wherein at least part of the housing and at least part of the fluid-filled device are provided as one part.

8. The food-forming-apparatus according to claim 1, wherein the food-forming-apparatus comprises a sensor to detect pressure and/or a distance between the pressure-plate and the drum.

9. The food-forming-apparatus according to claim 1, wherein:
pressure between the pressure-plate and an outer circumference of the drum is adjustable,
pressure between a cutting member and the outer circumference of the drum is adjustable and/or pressure between the manifold and the outer circumference of the drum is adjustable, based on the feed pressure of the food mass, respectively.

10. The food-forming-apparatus according to claim 1, wherein different pressure-zones between the pressure-plate and the drum are provided and are adjustable based on a feed pressure of the food mass.

11. The food-forming-apparatus according to claim 1, wherein the infeed channel expands from its inlet to its outlet in a longitudinal direction of the drum.

12. The food-forming-apparatus according to claim 1, wherein the food mass feed member comprises a filler within the food mass feed member.

13. The food-forming-apparatus according to claim 1, wherein the food mass feed member includes one or both front edge(s) and an inlet of the food mass is situated on the one or both front edge(s).

14. The food-forming-apparatus according to claim 13, wherein the inlet is substantially parallel to an axis of rotation of the drum.

15. The food-forming-apparatus according to claim 1, wherein the housing, the manifold, the infeed channel, a filler, the pressure-plate and/or one or more recesses are a single piece.

16. The food-forming-apparatus according claim 1, wherein at least one spring element is provided to apply a force on the pressure-plate.

17. The food-forming-apparatus according to claim 16, wherein the spring element is an O-ring.

18. The food-forming-apparatus according to claim 16, wherein the spring element is inflatable.

19. The food-forming-apparatus according to claim 1, wherein the product cavities are, at least partially made from a porous material.

* * * * *